United States Patent
Suresh et al.

(10) Patent No.: US 11,770,680 B2
(45) Date of Patent: Sep. 26, 2023

(54) METHODS AND APPARATUSES FOR AUTOMATICALLY COMMISSIONING LOCATORS

(71) Applicant: Hand Held Products, Inc., Fort Mill, SC (US)

(72) Inventors: Sandeep Suresh, Bangalore (IN); Sridhar Ravilla, Bangalore (IN); Abhishek Mathur, Bangalore (IN); Pankaj Kumar Pandey, Bangalore (IN)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 17/386,270

(22) Filed: Jul. 27, 2021

(65) Prior Publication Data

US 2022/0400357 A1    Dec. 15, 2022

(30) Foreign Application Priority Data

Jun. 11, 2021 (IN) .............................. 202111026023

(51) Int. Cl.
*H04W 4/02* (2018.01)

(52) U.S. Cl.
CPC .................................. *H04W 4/026* (2013.01)

(58) Field of Classification Search
None
See application file for complete search history.

(56) References Cited

U.S. PATENT DOCUMENTS

| 5,592,181 | A  | 1/1997 | Cai et al. |
| 9,933,507 | B2 | 4/2018 | Afzal |
| 2008/0309345 | A1 | 12/2008 | Zeller et al. |
| 2016/0358459 | A1* | 12/2016 | Singhar ................... H04W 4/50 |
| 2018/0167774 | A1* | 6/2018 | Hodge ................ H04M 3/2281 |
| 2020/0103231 | A1 | 4/2020 | Wang et al. |
| 2021/0058740 | A1* | 2/2021 | He ............................ G01S 3/20 |
| 2022/0201428 | A1* | 6/2022 | Ertan ...................... G06F 21/44 |

FOREIGN PATENT DOCUMENTS

| CN | 110488220 A | 11/2019 |
| WO | 2021/031714 A1 | 2/2021 |

OTHER PUBLICATIONS

European search report dated Nov. 22, 2022 for EP Application No. 22176131.

* cited by examiner

*Primary Examiner* — Ernest G Tacsik

(74) *Attorney, Agent, or Firm* — Alston & Bird LLP

(57) ABSTRACT

Method, apparatuses, and computer program products for automatically configuring one or more rotation angles for one or more associated locator units. An example method comprising receiving, from the one or more locator units, one or more dimensional values pertaining to the orientation of the one or more locator units; determining, based at least in part on the one or more received dimensional values for each of the one or more locator units and a configuration table pertaining to the locator unit type, one or more rotation angles for each of the one or more locator units; storing the one or more rotation angles for the each of the one or more locator units in an associated memory; and determining a location for one or more objects in an environment based at least upon the one or more rotation angles for each of the one or more locator units.

18 Claims, 12 Drawing Sheets

500

| ROT. X | ROT. Y | ROT. Z | ROLL | PITCH | YAW |
|---|---|---|---|---|---|
| 0 | 0 | 0 | +1.9° | +1.5° | -73.0° |
| 180 | 0 | 0 | +176.4° | +1.5° | -73.0° |
| 180 | 0 | 90 | +178.3° | -3.2° | +26.2° |
| 180 | 0 | -90 | +175.6° | -10.2° | -157.8° |
| 180 | 0 | 180 | +179.5° | +4.7° | +89.5° |
| 0 | 90 | 90 | +149.5° | +88.8° | -119.2° |
| 0 | -90 | -90 | +84.5° | +89.0° | +124.5° |
| 0 | 90 | -90 | +163.4° | -84.4° | +13.5° |
| 0 | -90 | 90 | +7.5° | -83.7° | +34.2° |
| 0 | 90 | 0 | +51.4° | +88.2° | -16.5° |
| 0 | -90 | 0 | +47.4° | +88.4° | -129.2° |
| 0 | 90 | -180 | +38.8° | +89.3° | +144.7° |
| 0 | -90 | -180 | +14.2° | +88.8° | +103.6° |

METHODS AND APPARATUSES FOR AUTOMATICALLY COMMISSIONING LOCATORS

CROSS-REFERENCES TO RELATED APPLICATION(S)

The present application claims priority to Indian Provisional Patent Application No. 202111026023 (filed Jun. 11, 2021), which is incorporated herein by reference in its entirety.

BACKGROUND

Indoor location technology solutions may be used for various applications, such as for asset tracking, navigation, logical geofencing, and the like. Indoor location technology solutions, such as real-time locating systems (RTLS), may utilize locator units capable of transmitting and/or receiving various signals, such as Bluetooth (BT), ultrawide band (UWB), narrowband internet of things (NB-IoT), cellular, or the like to determine the location of one or more objects. Such locator units may be deployed throughout a location and used to detect angle of arrival (AoA), angle of departure (AoD), or both (AoX), of a signal from an object within the environment, which may ultimately be used to determine the location of the object within the environment. RTLS systems may be utilized in a variety of environments such as in healthcare facilities, retail facilities, e-commerce facilities, and/or the like.

BRIEF SUMMARY

Various embodiments described herein relate to methods, apparatuses, and systems for automatically commissioning locators in various environments.

In accordance with various examples of the present disclosure, a method, apparatus, and computer program product are disclosed for automatically configuring one or more rotation angles for one or more associated locator units. In this regard, the method, apparatus and computer program product are configured to determine the one or more rotation angles for the one or more associated locator units based at least in part on one or more received dimensional values for the one or more locator units and a configuration table pertaining to the locator unit type. The one or more rotation angles for the one or more locator units may be used at least in part to determine a location for one or more objects in an environment.

In an example embodiment, a method is provided that includes receiving, from the one or more locator units, one or more dimensional values pertaining to the orientation of the one or more locator units. The method also includes determining, based at least in part on the one or more received dimensional values for each of the one or more locator units and a configuration table pertaining to the locator unit type, one or more rotation angles for each of the one or more locator units. The method further includes storing the one or more rotation angles for the each of the one or more locator units in an associated memory. The method further includes determining a location for one or more objects in an environment based at least upon the one or more rotation angles for each of the one or more locator units.

In some example embodiments, the method comprises receiving, from one or more locator units, one or more dimensional values pertaining to the orientation of the one or more locator units in response to a change in orientation of the one or more locator units. The method may further include updating, based at least in part on the one or more received dimensional values for the one or more locator units and a configuration table pertaining to the locator unit type, one or more rotation angles for each of the one or more locator units. The method may further include storing the one or more rotation angles for each of the one or more locator units in an associated memory.

In some embodiments, the one or more dimensional values pertaining to the orientation of the one or more locator units correspond to a roll, pitch, and yaw value. In some embodiments, the configuration table pertaining to the locator unit type provides one or more corresponding rotation angles for a particular roll, pitch, and yaw value.

In some embodiments, determining the one or more rotation angles for the one or more locator units comprises comparing the one or more received dimensional values for each locator unit of the one or more locator units with one or more dimensional values corresponding to one or more rotation angles in a configuration table pertaining to the locator unit type.

In some embodiments, determining the one or more rotation angles for the one or more locator units comprises applying one or more mathematical operations. The one or more mathematical operations uses one or more values based at least in part on the one or more received dimensional values for each locator unit and one or more rotation angles in the configuration table for pertaining to the locator unit type.

In some embodiments, the method further comprises receiving, from the one or more locator units, one or more signals indicative that one or more locator units detected one or more objects in an environment. The method may further include determining, based at least in part on the one or more rotation angles for each of the one or more locator units which received the one or more signals from the object, the position of the one or more objects within an environment.

In some embodiments, the one or more signals are indicative of an angle of arrival or angle of departure between each of the one or more locator units and each of the one or more objects.

In some embodiments, the one or more dimensional values pertaining to the orientation of the one or more locator units are received in an instance the change in orientation of the one or more locator units satisfies one or more predefined dimensional threshold values.

In some embodiments, the method further comprises ceasing one or more locator processes involving the one or more locator units whose one or more dimensional values pertaining to the orientation of the one or more locator units have been received. The method may further include resuming the one or more locator processes involving the one or more locator units after the one or more rotation angles for each of the one or more locator units have been determined.

In an example embodiment, an apparatus is provided including at least one processing component configured to receive, from the one or more locator units, one or more dimensional values pertaining to the orientation of the one or more locator units. The apparatus is also configured to determine, based at least in part on the one or more received dimensional values for each of the one or more locator units and a configuration table pertaining to the locator unit type, one or more rotation angles for each of the one or more locator units. The apparatus is also configured to store the one or more rotation angles for the each of the one or more locator units in an associated memory. The apparatus is also configured to determine a location for one or more objects in an environment based at least upon the one or more rotation angles for each of the one or more locator units.

In some embodiments, the apparatus is configured to receive, from one or more locator units, one or more dimensional values pertaining to the orientation of the one or more locator units in response to a change in orientation of the one or more locator units. In some embodiments, the apparatus is further configured may further be configured to update, based at least in part on the one or more received dimensional values for the one or more locator units and a configuration table pertaining to the locator unit type, one or more rotation angles for each of the one or more locator units. In some embodiments, the apparatus is further configured to store the one or more rotation angles for each of the one or more locator units in an associated memory.

In some embodiments, the one or more dimensional values pertaining to the orientation of the one or more locator units correspond to a roll, pitch, and yaw value. In some embodiments, the configuration table pertaining to the locator unit type provides one or more corresponding rotation angles for a particular roll, pitch, and yaw value.

In some embodiments, determining the one or more rotation angles for the one or more locator units comprises comparing the one or more received dimensional values for each locator unit of the one or more locator units with one or more dimensional values corresponding to one or more rotation angles in a configuration table pertaining to the locator unit type.

In some embodiments, determining the one or more rotation angles for the one or more locator units comprises applying one or more mathematical operations. The one or more mathematical operations uses one or more values based at least in part on the one or more received dimensional values for each locator unit and one or more rotation angles in the configuration table for pertaining to the locator unit type.

In some embodiments, the apparatus is configured to receive, from the one or more locator units, one or more signals indicative that one or more locator units detected one or more objects in an environment. In some embodiments, the apparatus is further configured to determine, based at least in part on the one or more rotation angles for each of the one or more locator units which received the one or more signals from the object, the position of the one or more objects within an environment.

In some embodiments, the one or more signals are indicative of an angle of arrival or angle of departure between each of the one or more locator units and each of the one or more objects.

In some embodiments, the one or more dimensional values pertaining to the orientation of the one or more locator units are received in an instance the change in orientation of the one or more locator units satisfies one or more predefined dimensional threshold values.

In some embodiments, the apparatus is further configured to cease one or more locator processes involving the one or more locator units whose one or more dimensional values pertaining to the orientation of the one or more locator units have been received. In some embodiments, apparatus is further configured to resume the one or more locator processes involving the one or more locator units after the one or more rotation angles for each of the one or more locator units have been determined.

In an example embodiment, a computer program product comprising at least one non-transitory computer-readable storage medium having computer executable program code instructions therein, the computer executable program code instructions comprising program code instructions configured, upon execution, to, receive, from the one or more locator units, one or more dimensional values pertaining to the orientation of the one or more locator units. The program code instructions may be configured to determine, based at least in part on the one or more received dimensional values for each of the one or more locator units and a configuration table pertaining to the locator unit type, one or more rotation angles for each of the one or more locator units. The program code instructions may be configured to store the one or more rotation angles for the each of the one or more locator units in an associated memory. The program code instructions may be configured to determine a location for one or more objects in an environment based at least upon the one or more rotation angles for each of the one or more locator units.

In some embodiments, the program code instructions may be configured to receive, from one or more locator units, one or more dimensional values pertaining to the orientation of the one or more locator units in response to a change in orientation of the one or more locator units. In some embodiments, the program code instructions may be configured to update, based at least in part on the one or more received dimensional values for the one or more locator units and a configuration table pertaining to the locator unit type, one or more rotation angles for each of the one or more locator units. the program code instructions may be configured to store the one or more rotation angles for each of the one or more locator units in an associated memory.

In some embodiments, the one or more dimensional values pertaining to the orientation of the one or more locator units correspond to a roll, pitch, and yaw value. In some embodiments, the configuration table pertaining to the locator unit type provides one or more corresponding rotation angles for a particular roll, pitch, and yaw value.

In some embodiments, determining the one or more rotation angles for the one or more locator units comprises comparing the one or more received dimensional values for each locator unit of the one or more locator units with one or more dimensional values corresponding to one or more rotation angles in a configuration table pertaining to the locator unit type.

In some embodiments, determining the one or more rotation angles for the one or more locator units comprises applying one or more mathematical operations. The one or more mathematical operations uses one or more values based at least in part on the one or more received dimensional values for each locator unit and one or more rotation angles in the configuration table for pertaining to the locator unit type.

In some embodiments, the program code instructions may be configured to receive, from the one or more locator units, one or more signals indicative that one or more locator units detected one or more objects in an environment. In some embodiments, the program code instructions may be configured to determine, based at least in part on the one or more rotation angles for each of the one or more locator units which received the one or more signals from the object, the position of the one or more objects within an environment.

In some embodiments, the one or more signals are indicative of an angle of arrival or angle of departure between each of the one or more locator units and each of the one or more objects.

In some embodiments, the one or more dimensional values pertaining to the orientation of the one or more locator units are received in an instance the change in orientation of the one or more locator units satisfies one or more predefined dimensional threshold values.

In some embodiments, the program code instructions may be configured to cease one or more locator processes involving the one or more locator units whose one or more dimensional values pertaining to the orientation of the one or more locator units have been received. In some embodiments, the program code instructions may be configured to resume the one or more locator processes involving the one or more locator units after the one or more rotation angles for each of the one or more locator units have been determined.

In an example embodiment, an apparatus is provided that includes means for receiving, from the one or more locator units, one or more dimensional values pertaining to the orientation of the one or more locator units. The apparatus also includes means for determining, based at least in part on the one or more received dimensional values for each of the one or more locator units and a configuration table pertaining to the locator unit type, one or more rotation angles for each of the one or more locator units. The apparatus also includes means for storing the one or more rotation angles for the each of the one or more locator units in an associated memory. The apparatus includes means for determining a location for one or more objects in an environment based at least upon the one or more rotation angles for each of the one or more locator units.

In some embodiments, the apparatus includes means for receiving, from one or more locator units, one or more dimensional values pertaining to the orientation of the one or more locator units in response to a change in orientation of the one or more locator units. In some embodiments, the apparatus includes means for updating, based at least in part on the one or more received dimensional values for the one or more locator units and a configuration table pertaining to the locator unit type, one or more rotation angles for each of the one or more locator units. In some embodiments, the apparatus includes means for storing the one or more rotation angles for each of the one or more locator units in an associated memory.

In some embodiments, the one or more dimensional values pertaining to the orientation of the one or more locator units correspond to a roll, pitch, and yaw value. In some embodiments, the configuration table pertaining to the locator unit type provides one or more corresponding rotation angles for a particular roll, pitch, and yaw value.

In some embodiments, determining the one or more rotation angles for the one or more locator units comprises comparing the one or more received dimensional values for each locator unit of the one or more locator units with one or more dimensional values corresponding to one or more rotation angles in a configuration table pertaining to the locator unit type.

In some embodiments, the apparatus includes means for receiving, from the one or more locator units, one or more signals indicative that one or more locator units detected one or more objects in an environment. In some embodiments, the apparatus includes means for determining, based at least in part on the one or more rotation angles for each of the one or more locator units which received the one or more signals from the object, the position of the one or more objects within an environment.

In some embodiments, the one or more signals are indicative of an angle of arrival or angle of departure between each of the one or more locator units and each of the one or more objects.

In some embodiments, the one or more dimensional values pertaining to the orientation of the one or more locator units are received in an instance the change in orientation of the one or more locator units satisfies one or more predefined dimensional threshold values.

In some embodiments, the apparatus includes means for ceasing one or more locator processes involving the one or more locator units whose one or more dimensional values pertaining to the orientation of the one or more locator units have been received. In some embodiments, apparatus includes means for resuming the one or more locator processes involving the one or more locator units after the one or more rotation angles for each of the one or more locator units have been determined.

In an example embodiment, a method is provided that includes determining, by utilizing an inertial measurement unit, one or more dimensional values pertaining to the orientation of the apparatus. The method further includes causing the transmission of data comprising the one or more dimensional values to be provided to a computing entity. The method further includes causing the transmission of data comprising one or more signals indicative that one or more objects have been detected in an environment to be provided to the computing entity.

In some embodiments, the method further includes detecting, by utilizing the inertial measurement unit, a change in the one or more dimensional values pertaining to the orientation of the apparatus. In some embodiments, the method further includes determining if the change in the one or more dimensional values satisfies one or more dimensional threshold values. In some embodiments, the method further includes causing the transmission of data comprising the one or more dimensional values to be provided to the computing entity in an instance the one or more dimensional values satisfy the one or more dimensional threshold values.

In some embodiments, the method further includes detecting, by utilizing one or more antenna array elements, one or more signals from one or more objects in the environment, wherein the one or more objects are configured to transmit one or more signals and the one or more antenna array elements are configured to receive the one or more signals. In some embodiments, the method further includes causing the transmission of data comprising the one or more signals received by the one or more antenna array elements from the one or more objects to be provided to the computing device.

In some embodiments, the one or more signals are indicative of an angle of arrival or angle of departure between each of the one or more antenna array elements and each of the one or more objects. In some embodiments, the one or more dimensional values correspond to a roll, pitch, and yaw value. In some embodiments, the computing device operates in a cloud computing environment. In some embodiments, the inertial measurement unit comprises a gyroscope, accelerometer, and magnetometer.

In an example embodiment, an apparatus is provided that includes an inertial measurement unit, an antenna array comprising one or more antenna array elements, and at least one processing component. The processing component is configured to determine, by utilizing the inertial measurement unit, one or more dimensional values pertaining to the orientation of the apparatus. The processing component is configured to cause the transmission of data comprising the one or more dimensional values to be provided to a computing entity. The processing component is configured to cause the transmission of data comprising one or more signals indicative that one or more objects have been detected in an environment to be provided to the computing entity.

In some embodiments, the processing component is further configured to detect, by utilizing the inertial measurement unit, a change in the one or more dimensional values pertaining to the orientation of the apparatus. In some embodiments, the processing component is configured to determine if the change in the one or more dimensional values satisfies one or more dimensional threshold values. In some embodiments, the processing component is configured to cause the transmission of data comprising the one or more dimensional values to be provided to the computing entity in an instance the one or more dimensional values satisfy the one or more dimensional threshold values.

In some embodiments, the processing component is configured to detect, by utilizing the one or more antenna array elements, one or more signals from one or more objects in the environment, wherein the one or more objects are configured to transmit one or more signals and the one or more antenna array elements are configured to receive the one or more signals. In some embodiments, the processing component is configured to cause the transmission of data comprising the one or more signals received by the one or more antenna array elements from the one or more objects to be provided to the computing device.

In some embodiments, the one or more signals are indicative of an angle of arrival or angle of departure between each of the one or more antenna array elements and each of the one or more objects. In some embodiments, the one or more dimensional values correspond to a roll, pitch, and yaw value. In some embodiments, the computing device operates in a cloud computing environment. In some embodiments, the inertial measurement unit comprises a gyroscope, accelerometer, and magnetometer.

In an example embodiment, a computer program product comprising at least one non-transitory computer-readable storage medium having computer executable program code instructions therein, the computer executable program code instructions comprising program code instructions configured, upon execution, to, determine, by utilizing an inertial measurement unit, one or more dimensional values pertaining to the orientation of the apparatus. The program code instructions may be configured to cause the transmission of data comprising the one or more dimensional values to be provided to a computing entity. The program code instructions may be configured to cause the transmission of data comprising one or more signals indicative that one or more objects have been detected in an environment to be provided to the computing entity.

In some embodiments, the program code instructions may be configured to detect, by utilizing the inertial measurement unit, a change in the one or more dimensional values pertaining to the orientation of the apparatus. In some embodiments, the program code instructions may be configured to determine if the change in the one or more dimensional values satisfies one or more dimensional threshold values. In some embodiments, the program code instructions may be configured to cause the transmission of data comprising the one or more dimensional values to be provided to the computing entity in an instance the one or more dimensional values satisfy the one or more dimensional threshold values.

In some embodiments, the program code instructions may be configured to detect, by utilizing one or more antenna array elements, one or more signals from one or more objects in the environment, wherein the one or more objects are configured to transmit one or more signals and the one or more antenna array elements are configured to receive the one or more signals. In some embodiments, the program code instructions may be configured to cause the transmission of data comprising the one or more signals received by the one or more antenna array elements from the one or more objects to be provided to the computing device.

In some embodiments, the one or more signals are indicative of an angle of arrival or angle of departure between each of the one or more antenna array elements and each of the one or more objects. In some embodiments, the one or more dimensional values correspond to a roll, pitch, and yaw value. In some embodiments, the computing device operates in a cloud computing environment. In some embodiments, the inertial measurement unit comprises a gyroscope, accelerometer, and magnetometer.

In an example embodiment, an apparatus is provided that includes means for determining, by utilizing an inertial measurement unit, one or more dimensional values pertaining to the orientation of the apparatus. The apparatus further includes means for causing the transmission of data comprising the one or more dimensional values to be provided to a computing entity. The apparatus further includes means for causing the transmission of data comprising one or more signals indicative that one or more objects have been detected in an environment to be provided to the computing entity.

In some embodiments, the apparatus further includes means for detecting, by utilizing the inertial measurement unit, a change in the one or more dimensional values pertaining to the orientation of the apparatus. In some embodiments, the apparatus further includes means for determining if the change in the one or more dimensional values satisfies one or more dimensional threshold values. In some embodiments, the apparatus further includes means for causing the transmission of data comprising the one or more dimensional values to be provided to the computing entity in an instance the one or more dimensional values satisfy the one or more dimensional threshold values.

In some embodiments, the apparatus further includes means for detecting, by utilizing one or more antenna array elements, one or more signals from one or more objects in the environment, wherein the one or more objects are configured to transmit one or more signals and the one or more antenna array elements are configured to receive the one or more signals. In some embodiments, apparatus further includes means for causing the transmission of data comprising the one or more signals received by the one or more antenna array elements from the one or more objects to be provided to the computing device.

In some embodiments, the one or more signals are indicative of an angle of arrival or angle of departure between each of the one or more antenna array elements and each of the one or more objects. In some embodiments, the one or more dimensional values correspond to a roll, pitch, and yaw value. In some embodiments, the computing device operates in a cloud computing environment. In some embodiments, the inertial measurement unit comprises a gyroscope, accelerometer, and magnetometer.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 5 provides an operational example of a configuration table in accordance with some embodiments of the present disclosure;

DETAILED DESCRIPTION OF THE INVENTION

Figure 1A:
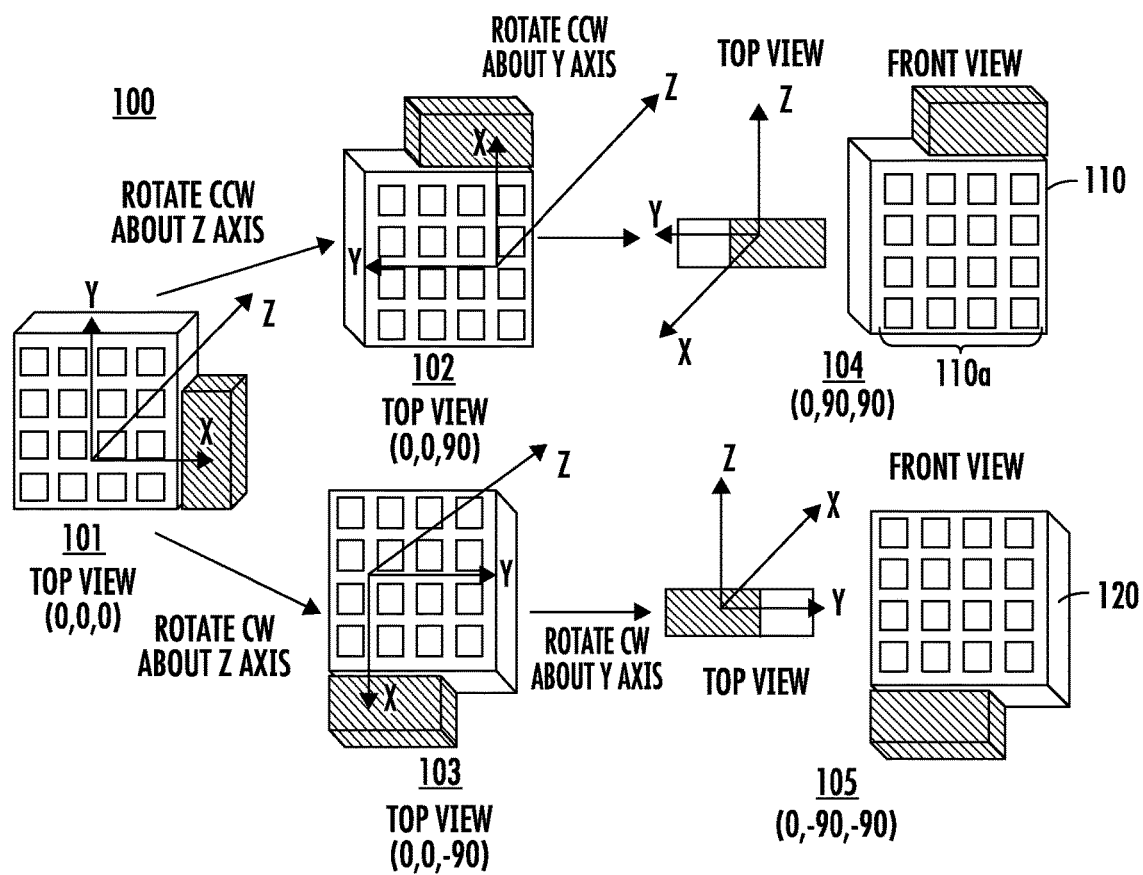
FIGS. 1A-E illustrates a real-time location system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, a computational platform, predictive data analysis system, sensing unit, warehouse management system, and control unit) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

Indoor location technology solutions, such as RTLS, may be useful for a variety of applications. As previously mentioned, RTLS systems may be utilized in a variety of environments such as in healthcare facilities, retail facilities, e-commerce facilities, and/or the like. Furthermore, such RTLS systems may be utilized for a variety of applications such as for monitoring when objects are received, put-away, picked, sorted, shipped, and may further be used to, track one or more objects throughout an environment. Objects within these environments, such as for example forklifts, workers, packages, assets and/or the like may be configured with tags such that their respective locations may be determined. These tags may be wireless tags capable of transmitting one or more signals such radio frequency (RF) signals including BT, UWB, NB-IoT, cellular, or the like. Additionally or alternatively, optical and/or acoustic signaling may be used. Regardless of the signaling technology, locator units may be configured to receive these one or more transmitted signals from the object. When the object is located within a proximity range of the locator unit such that the locator unit is capable of receiving the one or more transmitted signals from the object, the location of the object may be determined based on a known position of the locator unit. In some embodiments, the location of the object may be determined within sub-meter accuracy.

A locator unit may be configured with one or more elements capable of receiving the signals from the object within its corresponding proximity range using one or more antenna array elements. These one or more antenna array elements, such as one or more receivers, may be capable of receiving one or more signals from the object. The antenna array element configuration on the locator unit may be known such that an AOA, AOD, and/or AOX may be determined between the object and the locator unit. The AOA, AOD, and/or AOX angles may be determined based at least in part on the phase of the received signal from the object and/or a phase difference between the one or more antenna array elements. Furthermore, the location of the object within the environment may be determined based at least in part on the AOA, AOD, and/AOX angles between the one or more antenna array elements and the object.

In order to accurately determine the AOA, AOD, and/or AOX angles and ultimately to accurately determine the location of the object within the environment, the orientation of the locator unit within a particular degree of accuracy is advantageous, in some examples. However, currently the installation of the locator units is performed manually and is prone to error. For example, if the locator unit is rotated during the installation such that a rotation angle of the locator unit is different than the rotation angle configured for the locator unit by a system, the location of an object may be inaccurate as the system would be configured with the incorrect rotation angle for the locator unit. Furthermore, even if the locator unit is installed correctly, the locator unit may be inadvertently moved such as during maintenance, due to a collision, etc. such that one or more rotation angles configured for the locator unit are no longer accurate.

As such, it may be beneficial, in some examples, to automatically determine one or more rotation angles for the locator device in real-time or near real-time such that the one or more rotation angles configured for the rotation unit are up-to-date and accurate and therefore result in an accurate object location determination. In some embodiments, the one or more rotation angles of a locator unit describe the orientation of the locator unit with respect to a mounting context. To that end, the present disclosure, in some examples, provides a system and method for automatically configuring one or more rotation angles for one or more locator units. As such, the one or more rotation angle for the one or more locator units may be accurately maintained such that the location of an object may be accurately determined. Furthermore, the one or more locator units may be configured to determine if the respective locator unit has changed orientation and if so, may inform a computing entity of this change such that the computing entity may update the one or more rotation angles for the corresponding locator unit. In this way, the rotation angles for the one or more locator units may be accurately maintained such that the computing entity may determine an accurate location of an objected detected by the one or more locator units.

FIGS. 1A-E schematically depicts an RTLS 100 comprising a locator unit 110 and a locator unit 120. As can be seen in FIG. 1A, locator unit 110 and locator unit 120 may be positioned in different orientations and therefore, are associated with different rotation angles. In some embodiments, the one or more rotation angles of a locator unit describe the orientation of the locator unit with respect to a mounting context. In some embodiments, the mounting context is the surface upon which the locator unit is mounted. For example, the mounting context may be a floor, ceiling, wall, support pillar, etc. As an example of how these rotation angles may be achieved, an initial locator unit orientation 101 may be chosen such that each rotation angle corresponds to a value of 0. In this example, the initial locator unit orientation 101 may correspond to three rotation angles including a x-axis rotation angle, y-axis rotation angle, and z-axis rotation angle, which may be denoted by a (x, y, z) format. As such, the rotation angles may be represented as (0, 0, 0). In some embodiments, the rotation angles (0, 0, 0) may correspond to the orientation when a locator unit is placed flat on a floor. However, as will be appreciated by one of skill in the art, any locator unit orientation may be chosen for rotation angles (0, 0, 0). Additionally, although cartesian coordinates are depicted in this example embodiment, any coordinate system may be contemplated including but not limited to a polar coordinate system and/or a cylindrical coordinate system.

In order to achieve the orientation and rotation angles for locator unit 110, the locator unit corresponding to an initial locator unit orientation 101 may be rotated counter-clockwise about its z-axis (not-shown) by 90 degrees. In this particular example, the x-axis and y-axis are considered to be parallel to the floor and the z-axis to be perpendicular to the floor and the devices axes are considered the same initially. A new locator unit orientation 102 is depicted with corresponding rotation angles (0, 0, 90). The locator unit corresponding to locator unit orientation 102 may be rotated counter-clockwise about its y-axis again by 90 degrees. The new locator unit orientation 104 is depicted with corresponding rotation angles (0, 90, 90). The resulting locator unit orientation 104 corresponding to locator unit 110 now has a new set of rotation angles and is depicted from both the front view and top view. In this example, locator unit 110 is now positioned upright (as opposed to lying flat on the floor as depicted in locator unit orientation 101) with its antenna array 110a facing outward. As such, the device axes are now rotated such that the x-axis and y-axis are now perpendicular to the floor and the z-axis is parallel to the floor.

Similarly, in order to achieve the orientation and rotation angles for locator unit 120, the locator unit corresponding to an initial locator unit orientation 101 may be rotated clockwise about its z-axis (not-shown) by 90 degrees. This time, the new locator unit orientation 103 is depicted with corresponding rotation angles (0, 0, −90). The locator unit corresponding to locator unit orientation 103 may be rotated clockwise about its y-axis again by 90 degrees. The new locator unit orientation 105 is depicted with corresponding rotation angles (0, −90, −90). The resulting locator unit orientation 105 corresponding to locator unit 120 now has a new set of rotation angles and is depicted from both the front view and top view. In this example, locator unit 120 is now positioned upright similar to locator unit 110 but with its antenna array 120a (not directly shown) facing inward (as opposed to the outwardly oriented antenna array of locator unit 110). Similarly, here, the device axes are now rotated such that the x-axis and y-axis are now perpendicular to the floor and the z-axis is parallel to the floor.

As will be appreciated by one of skill in the art, the process depicted in FIG. 1A is a purely exemplary process for achieving two locator unit orientations. However, the locator unit orientation may be achieved by any number and any variety of orientation changes.

Figure 1B:
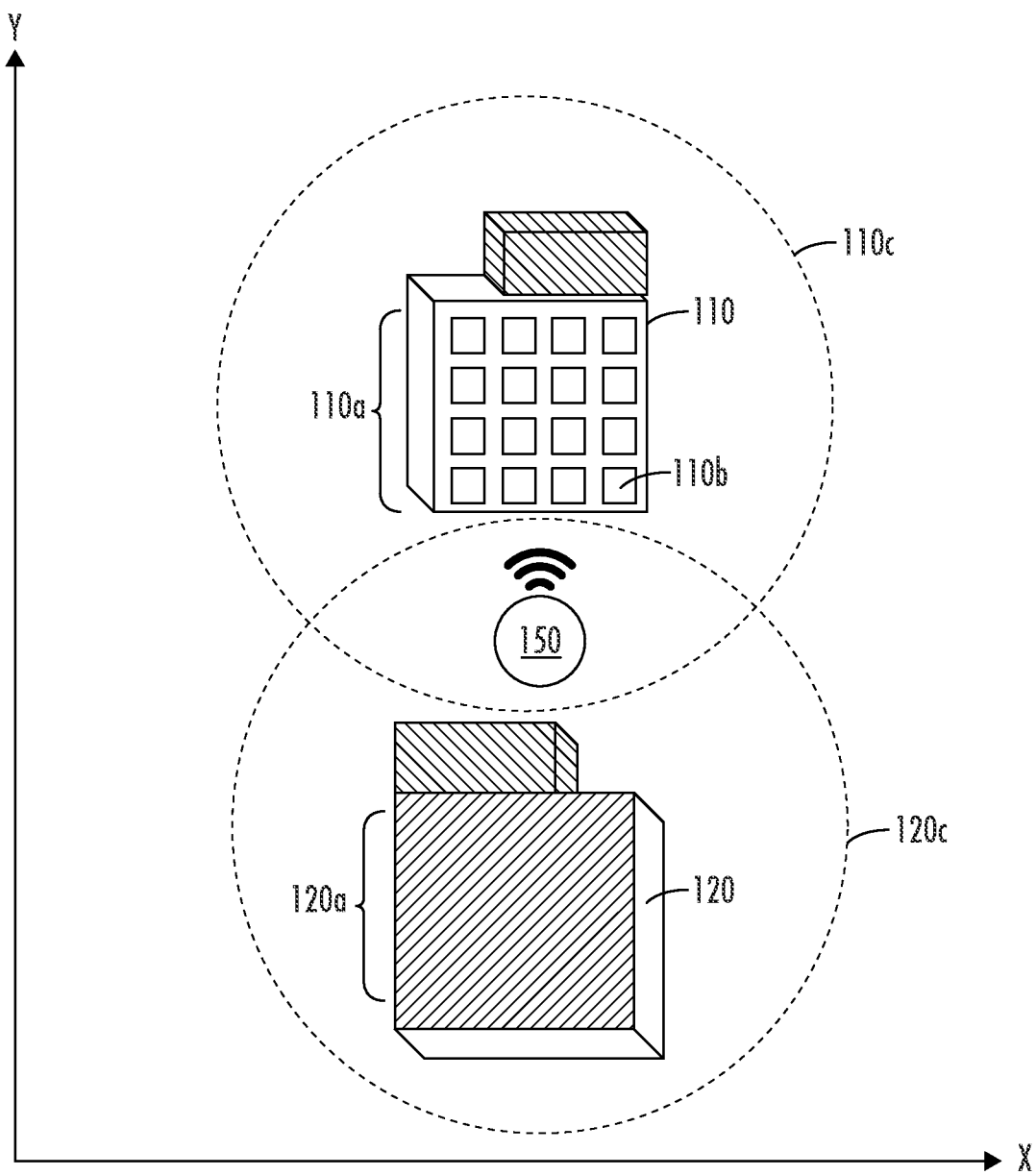

Referring now to FIG. 1B, the locator units 110 and 120 are shown as deployed in the RTLS environment 100. More specifically, FIG. 1B depicts the locator units 110 and 120 from the front view. The locator units 110 and 120 may each have one or more coordinates indicative of the location of the respective locator unit within the environment. Although depicted on a cartesian coordinate plane showing only the x-axis and y-axis, a z-axis may also be included. Additionally, although cartesian coordinates are depicted in this example embodiment, any coordinate system may be contemplated including but not limited to a polar coordinate system and/or a cylindrical coordinate system.

As previously shown in FIG. 1A, the locator unit orientation for locator unit 110 may be represented as (0, 90, 90) indicative that locator unit 110 is positioned upright with its antenna array 110a facing outward and the locator unit orientation for locator unit 120 may be represented as (0, −90, −90) indicative that locator unit 120 is positioned upright with its antenna array 120a facing inward. Additionally, the locator units 110 and 120 may each be associated with a proximity range 110c and 120c, respectively. The proximity range 110c and 120c are indicative of the environment proximate the locator units 110 and 120, respectively, within which the locator units may detect one or more signals from one or more objects. For example, an object 150 configured to transmit one or more signals, such as a Bluetooth signal may be detected by both locator unit 110 and 120 as the object 150 is within the proximate range 110c and 120c. In some embodiments, the object 150 may transmit a Bluetooth 5.1 signal capable of transmitting a constant tone extension (CTE) such that the Bluetooth packet is transmitted with a constant tone with a continuous phase, constant amplitude, and constant frequency signal. However, as would be obvious to one of skill in the art, any RF signaling such as BT, UWB, NB-IoT, cellular, or the like may be contemplated. Additionally or alternatively, optical signaling and/or acoustic signaling may be used. In some embodiments, the object 150 may transmit a single signal to the locator unit. In some embodiments, the object 150 may be configured to simultaneously transmit a plurality of signals to the locator unit.

The antenna array 110a and 120a may be configured to receive the one or more transmitted signals. To accomplish this, the antenna array 110a and 120a may comprise one or more antenna array elements, such as 110b. Each antenna array element, such as 110b, may comprise a receiver capable of receiving a signal, a transmitter capable of transmitting a signal, and/or a receiver and transmitter capable of both receiving and transmitting signals. As can be seen in FIG. 1B, in this particular example, the antenna array 110a is configured such that the antenna array elements are arranged in a four by four pattern, for a total of 16 antenna array elements. However, any antenna array configuration may be contemplated, including but not limited to a three by three antenna array or a single antenna array element.

Although the antenna array 120a cannot be directly seen due to the antenna array 120a facing inward, the antenna array 120a is similarly configured. Further, the particular configuration of antenna array elements within the antenna array 110a and 120a is known such that the particular width and height of each antenna array element, such as antenna array element 110b, the distance between each antenna array element, and the overall length and height of the antenna array 110a and 120a is known.

Figure 1C:
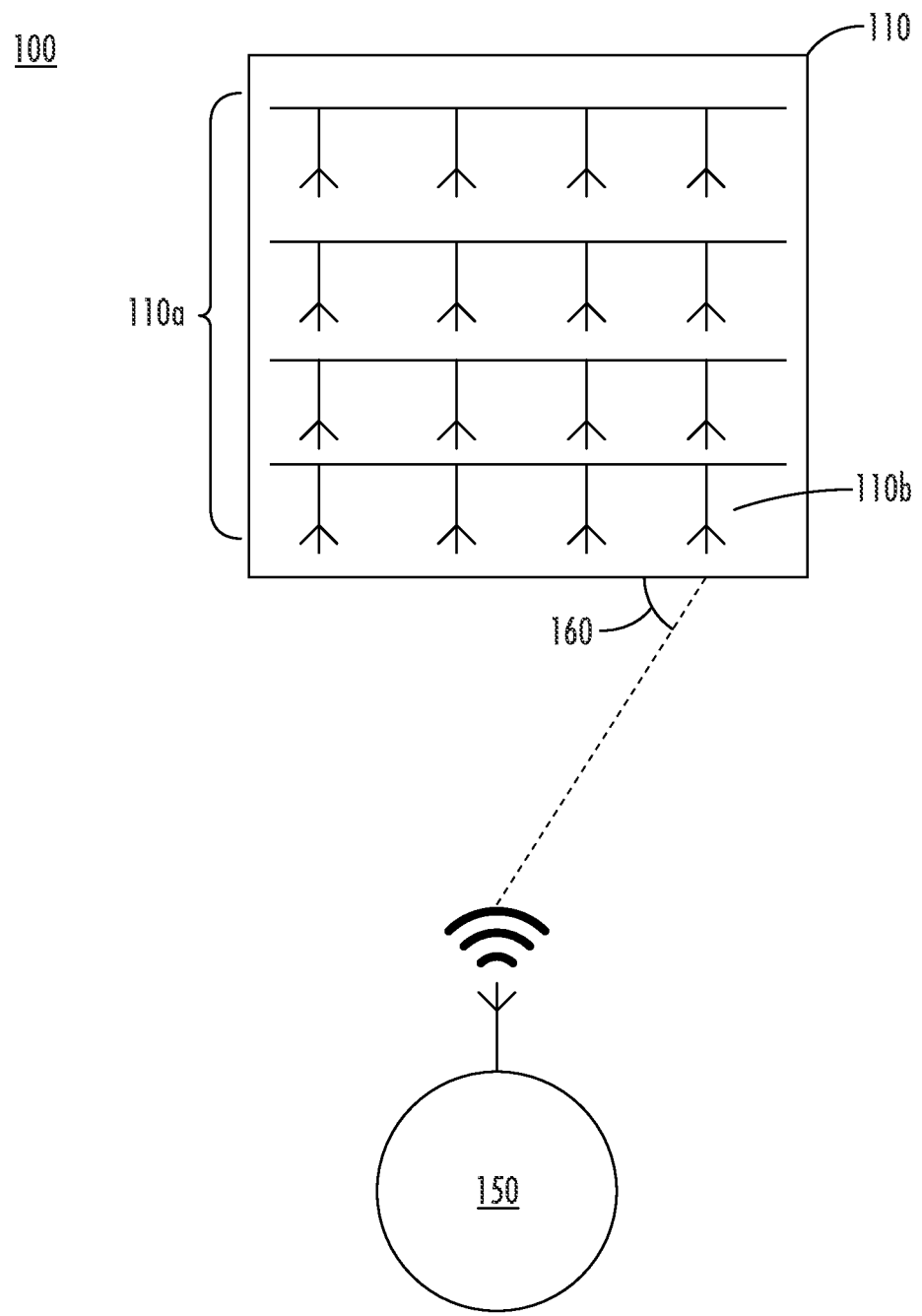
Figure 1D:
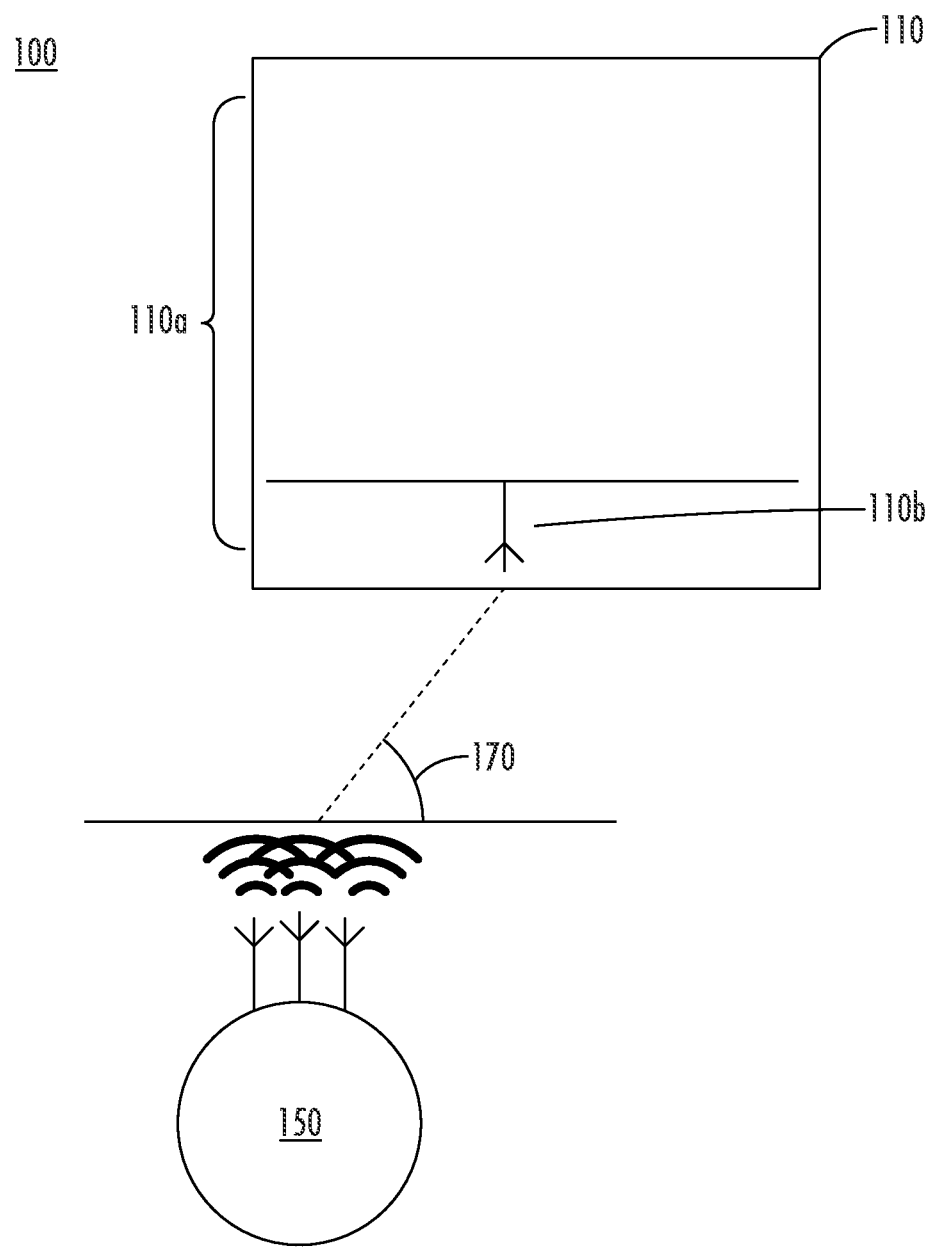

FIGS. 1C-D illustrates an example process for a locator unit, such as locator unit 110, receiving one or more signals from an object. The configuration of the antenna array 110a and 120a (not shown) comprising one or more antenna array elements can be used to determine the AOA, AOD, and/or AOX of the received signal from the object. For example, object 150 may transmit one or more signals that may be received by locator unit 110 using its one or more antenna array elements comprising the antenna array 110a. One or more antenna array element configured as a receiver comprising the antenna array 110a may receive the signal. However, the received signal may be associated with a different signal phase between each antenna array element comprising the antenna array 110a due to the difference in distance between the object 150 and the antenna array elements comprising the antenna array 110a. FIG. 1C shows an AOA 160 between a transmitted signal from the object 150 and antenna array element 110b of the one or more antenna array elements 110a. Additionally or alternatively, the antenna array element may be a single antenna array element that receives a plurality of transmitted signals from the object 150 and determines the phase difference between the received plurality of signals. FIG. 1D shows an AOD 170 between a plurality of transmitted signals from object 150 and an antenna array element 110b. In either case, the signal phase difference may be determined such that the AOA, AOD, and/or AOX may be determined between the object 150 and the locator unit 110. The AOA, AOD, and/or AOX may be indicative of the direction of the object 150.

The AOA, AOD, and/or AOX may be similarly determined by locator unit 120 using its one or more antenna array elements comprising the antenna array 120a. As such, the locator unit 120 may also determine a direction of the object 150. Both locator unit 110 and 120 may transmit an indication of the AOA, AOD, and/or AOX between the respective locator unit and the object 150 to a computing entity 200, such as a positioning computing entity 200. A positioning computing entity 200 may be configured with the relative location of one or more locator units and the orientation of the one or more locator units (e.g. the one or more rotation angles). Based at least in part on the received AOA, AOD, and/or AOX between locator units 110 and 120, and the object 150 indicative of the direction of the object 150 from the respective locator unit, the positioning computing entity may determine the location of the object 150 in the environment.

Figure 1E:
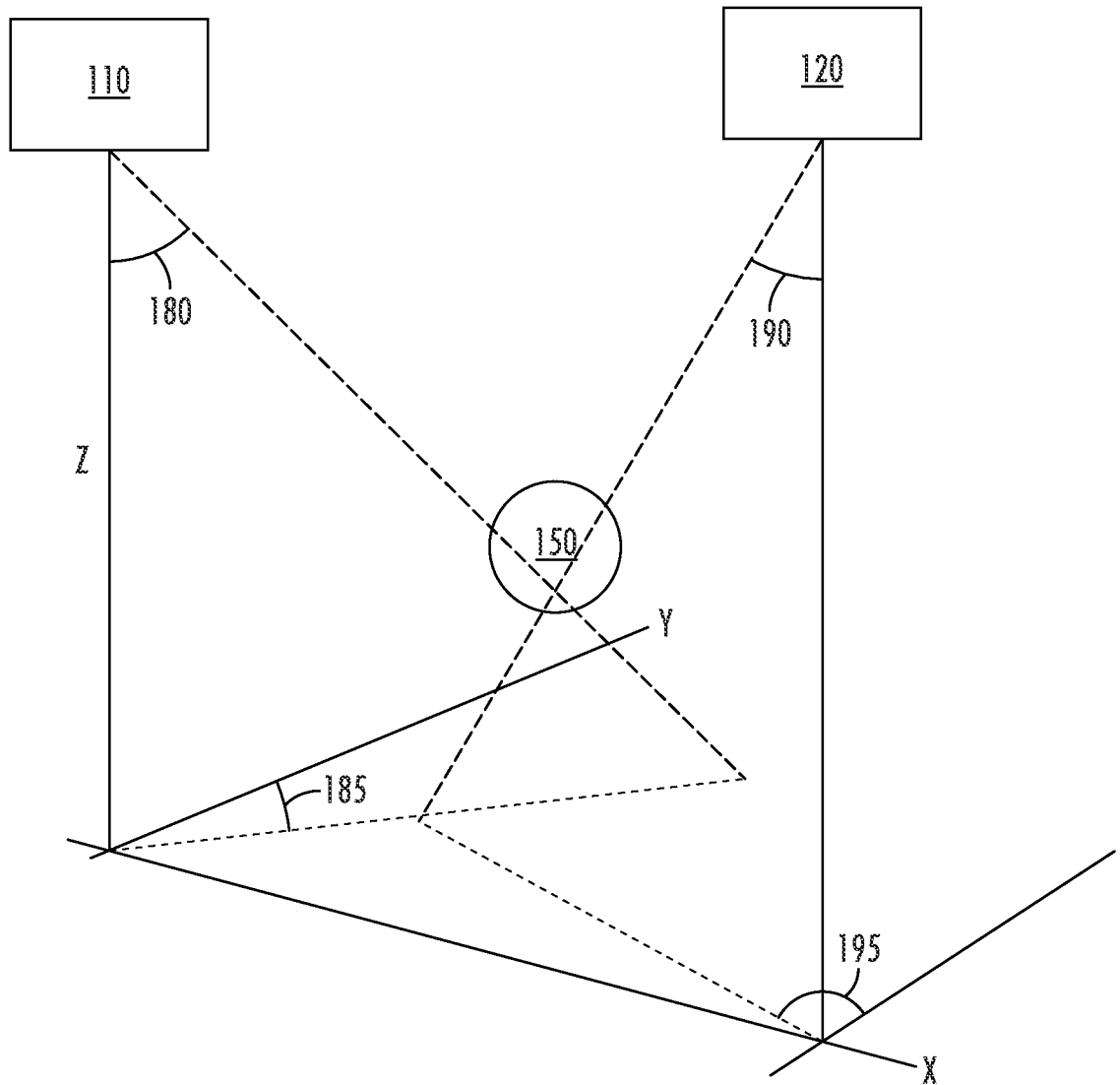
Figure 2:
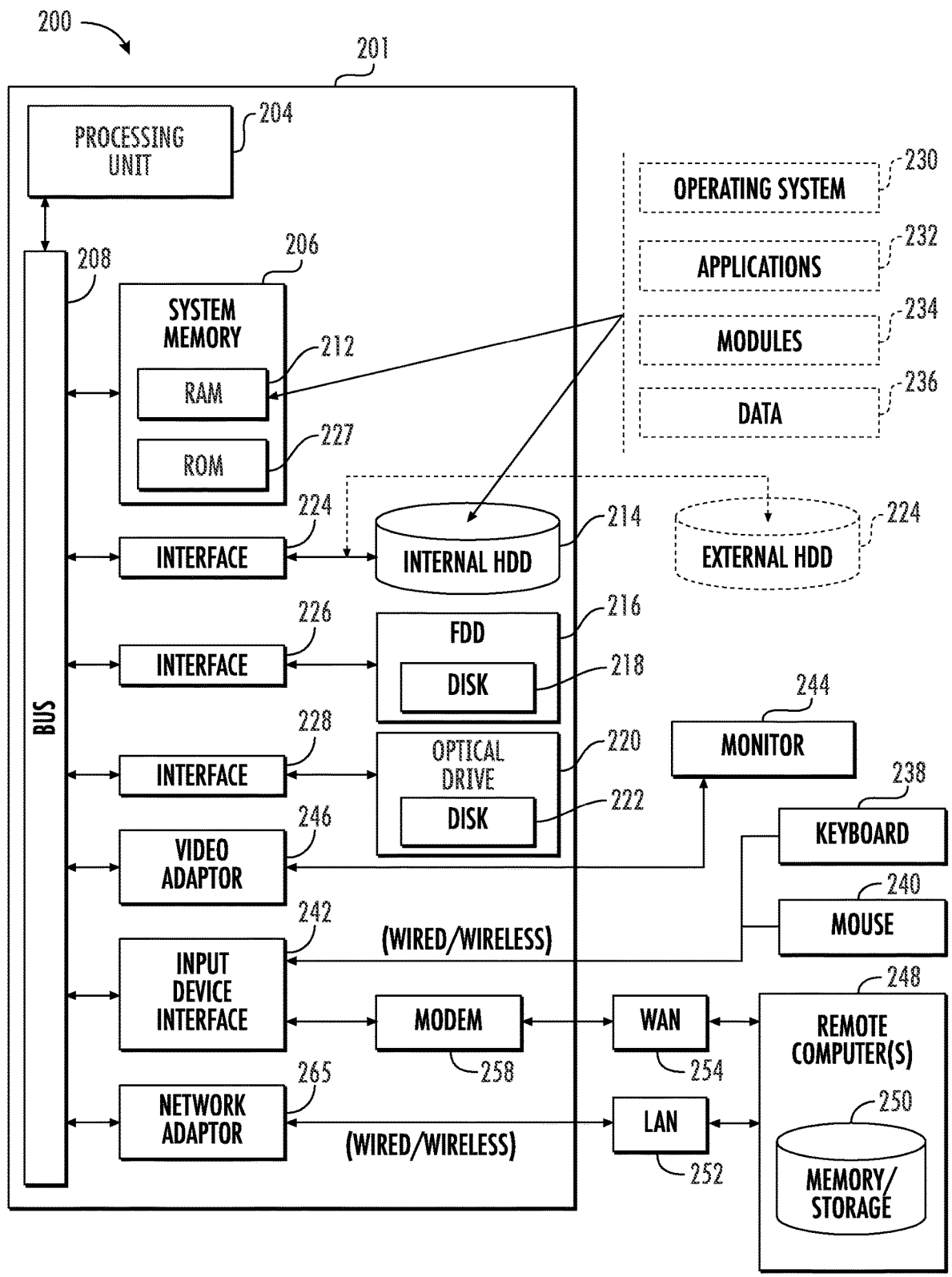
FIG. 2 illustrates an example apparatus in accordance with various embodiments of the present disclosure.

FIG. 1E illustrates locator units 110 and 120 as deployed in an operational example environment similar to that of FIG. 1B. When an object 150 enters into a proximity range of locator units 110 and 120, the object 150 may be detected by the locator units 110 and 120 as described above. Furthermore, the AOA, AOD, and/or AOX between the locator units 110 and 120 and the object 150 may be used to determine an elevation angle and an azimuthal angle between the object 150 and each of the locator units 110 and 120. The elevation angle may be the angular measurement between the locator unit and a horizontal plane, such as the floor, that intersects through the object. The elevation angle may based at least in part on the AOA, AOD, and/or AOX. The azimuthal angle may be the angular measurement between a reference plane, such as the plane formed between the x-axis, y-axis, and/or z-axis, and the vector projected perpendicularly onto the reference plane. FIG. 1E shows the detection of object 150 by locator unit 110 and the elevation angle 180 and corresponding azimuthal angle 185. Similarly, locator unit 120 may detect the object 150 and have an associated elevation angle 190 and corresponding azimuthal angle 195. In some embodiments, the location of the object may be determined based at least in part on the one or more elevation angles and/or one or more azimuthal angles as determined based at least in part on the AOA, AOD, and/or AOX. Referring now to FIG. 2, there is illustrated a block diagram of a computer entity 200, operable to execute the functions and operations performed in the described example embodiments. For example, a computing device (e.g. a positioning computing entity in communication with one or more locator units) may contain components as described in FIG. 2. The computing entity 200 can provide networking and communication capabilities between a wired or wireless communication network and a server and/or communication device. In order to provide additional context for various aspects thereof, the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computing entities, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computing entity and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 2, implementing various aspects described herein with regards to the end-user device can include a computing entity 200, the computing entity 200 including a processing unit 204, a system memory 206 and a system bus 208. The system bus 208 couples system components including, but not limited to, the system memory 206 to the processing unit 204. The processing unit 204 can be any of various commercially available processors. Dual microprocessors and other multi-processor architectures can also be employed as the processing unit 204.

The system bus 208 can be any of several types of bus structure that can further interconnect to a memory bus (with or without a memory controller), a peripheral bus, and a local bus using any of a variety of commercially available bus architectures. The system memory 206 includes read-only memory (ROM) 227 and random access memory (RAM) 212. A basic input/output system (BIOS) is stored in a non-volatile memory 227 such as ROM, EPROM, EEPROM, which BIOS contains the basic routines that help to transfer information between elements within the computing entity 200, such as during start-up. The RAM 212 can also include a high-speed RAM such as static RAM for caching data.

The computing entity 200 further includes an internal hard disk drive (HDD) 214 (e.g., EIDE, SATA), which internal hard disk drive 214 can also be configured for external use in a suitable chassis (not shown), a magnetic floppy disk drive (FDD) 216, (e.g., to read from or write to a removable diskette 218) and an optical disk drive 220, (e.g., reading a CD-ROM disk 222 or, to read from or write to other high capacity optical media such as the DVD). The hard disk drive 214, magnetic disk drive 216 and optical disk drive 220 can be connected to the system bus 208 by a hard disk drive interface 224, a magnetic disk drive interface 226 and an optical drive interface 228, respectively. The interface 224 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computing entity 200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computing entity 200, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 212, including an operating system 230, one or more application programs 232, other program modules 234 and program data 236. All or portions of the operating system, applications, modules, and/or data can also be cached in the RAM 212. It is to be appreciated that the various embodiments can be implemented with various commercially available operating systems or combinations of operating systems.

A user can enter commands and information into the computing entity 200 through one or more wired/wireless input devices, e.g., a keyboard 238 and a pointing device, such as a mouse 240. Other input devices (not shown) may include a microphone, an IR remote control, a joystick, a game pad, a stylus pen, touch screen, or the like. These and other input devices are often connected to the processing unit 204 through an input device interface 242 that is coupled to the system bus 208, but can be connected by other interfaces, such as a parallel port, an IEEE 1394 serial port, a game port, a USB port, an IR interface, etc.

A monitor 244 or other type of display device is also connected to the system bus 208 through an interface, such as a video adapter 246. In addition to the monitor 244, a computing entity 200 typically includes other peripheral output devices (not shown), such as speakers, printers, etc.

The computing entity 200 can operate in a networked environment using logical connections by wired and/or wireless communications to one or more remote computing entities, such as a remote computing entity 248. The remote computing entity 248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 250 is illustrated. The logical connections depicted include wired/wireless connectivity to a local area network (LAN) 252 and/or larger networks, e.g., a wide area network (WAN) 254. Such LAN and WAN networking environments are commonplace in offices and companies, and facilitate enterprise-wide computer networks, such as intranets, all of which may connect to a global communications network, e.g., the Internet.

When used in a LAN networking environment, the computing entity 200 is connected to the local network 252 through a wired and/or wireless communication network interface or adapter 256. The adapter 256 may facilitate wired or wireless communication to the LAN 252, which may also include a wireless access point disposed thereon for communicating with the wireless adapter 256.

When used in a WAN networking environment, the computing entity 200 can include a modem 258, or is connected to a communications server on the WAN 254, or has other means for establishing communications over the WAN 254, such as by way of the Internet. The modem 258, which can be internal or external and a wired or wireless device, is connected to the system bus 208 through the input device interface 242. In a networked environment, program modules depicted relative to the computer, or portions thereof, can be stored in the remote memory/storage device 250. It will be appreciated that the network connections shown are exemplary and other means of establishing a communications link between the computers can be used.

The computing entity is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Additionally, embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including", and variants thereof are used in either the detailed description or the claims, these terms are intended to be inclusive in a manner similar to the term "comprising."

Figure 3:
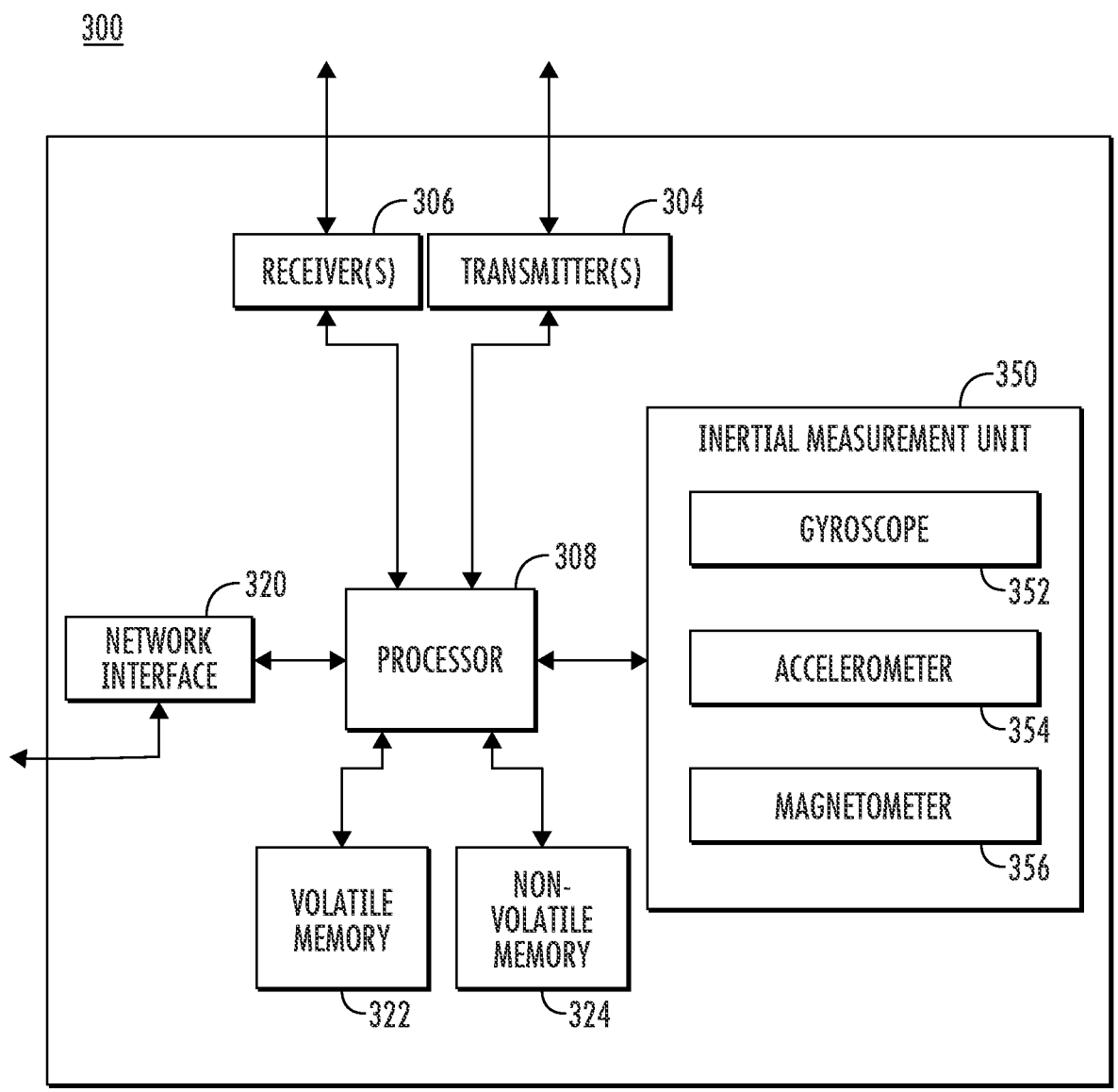
FIG. 3 illustrates an example apparatus in accordance with various embodiments of the present disclosure.

FIG. 3 provides an illustrative schematic representative of computing entity 300 that can be used in conjunction with embodiments of the present invention. In some embodiments the computing entity 300 is a locator unit. In some embodiments, the computing entity 300 may be a remote computing entity 248. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. The computing entity 300 can be operated by various parties. As shown in FIG. 3, the computing entity 300 can include one or more transmitters 304 (e.g., radio), one or more receivers 306 (e.g., radio), and a processor 308 (e.g., CPLDs, microprocessors, multi-core processors, coprocessing entities, ASIPs, microcontrollers, and/or controllers) that provides signals to and receives signals from the one or more transmitters 304 and one or more receivers 306, correspondingly.

The signals provided to and received from the one or more transmitters 304 and the one or more receivers 306, correspondingly, may include signaling information/data in accordance with air interface standards of applicable wireless systems. In this regard, the computing entity 300 may be capable of operating with one or more air interface standards, communication protocols, modulation types, and access types. More particularly, the computing entity 300 may operate in accordance with any of a number of wireless communication standards and protocols, such as those described above with regard to the computing entity 200. In a particular embodiment, the computing entity 300 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 300 may operate in accordance with multiple wired communication standards and protocols, such as those described above with regard to the computing entity 200 via a network interface 320.

Via these communication standards and protocols, the computing entity 300 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing entity 300 can also download changes, add-ons, and updates, for instance, to its firmware, software (e.g., including executable instructions, applications, program modules), and operating system.

According to one embodiment, the computing entity 300 may include location determining aspects, devices, modules, functionalities, and/or similar words used herein interchangeably. For example, the computing entity 300 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the computing entity 300 position in connection with a variety of other systems, including cellular towers, Wi-Fi access points, and/or the like. Similarly, the computing entity 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 300 can also include an inertial measurement unit 350 configured to measure at least the orientation of the computing entity 300. In some embodiments, the inertial measurement unit 350 comprises one or more gyroscope 352, one or more accelerometers 354, and/or one or more magnetometers 356. The one or more gyroscopes 352 may include electromechanical devices for measuring angular velocity with respect to the x-axis, y-axis, and/or z-axis. The one or more accelerometers 354 may include electromechanical devices for measuring acceleration forces in an x-axis, y-axis, and/or z-axis with respect to a computing entity, such as computing entity 300. The one or more magnetometers may include electromechanical devices for measuring magnetic forces with respect to the x-axis, y-axis, and/or z-axis.

The computing entity 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the computing entity 300. As indicated, this may include a user application that is resident on the entity or accessible through a browser or other user interface for communicating with the computing entity 200 and/or various other computing entities.

In another embodiment, the computing entity 300 may include one or more components or functionality that are the same or similar to those of the computing entity 200, as described in greater detail above. As will be recognized, these frameworks and descriptions are provided for exemplary purposes only and are not limiting to the various embodiments.

Figure 4:
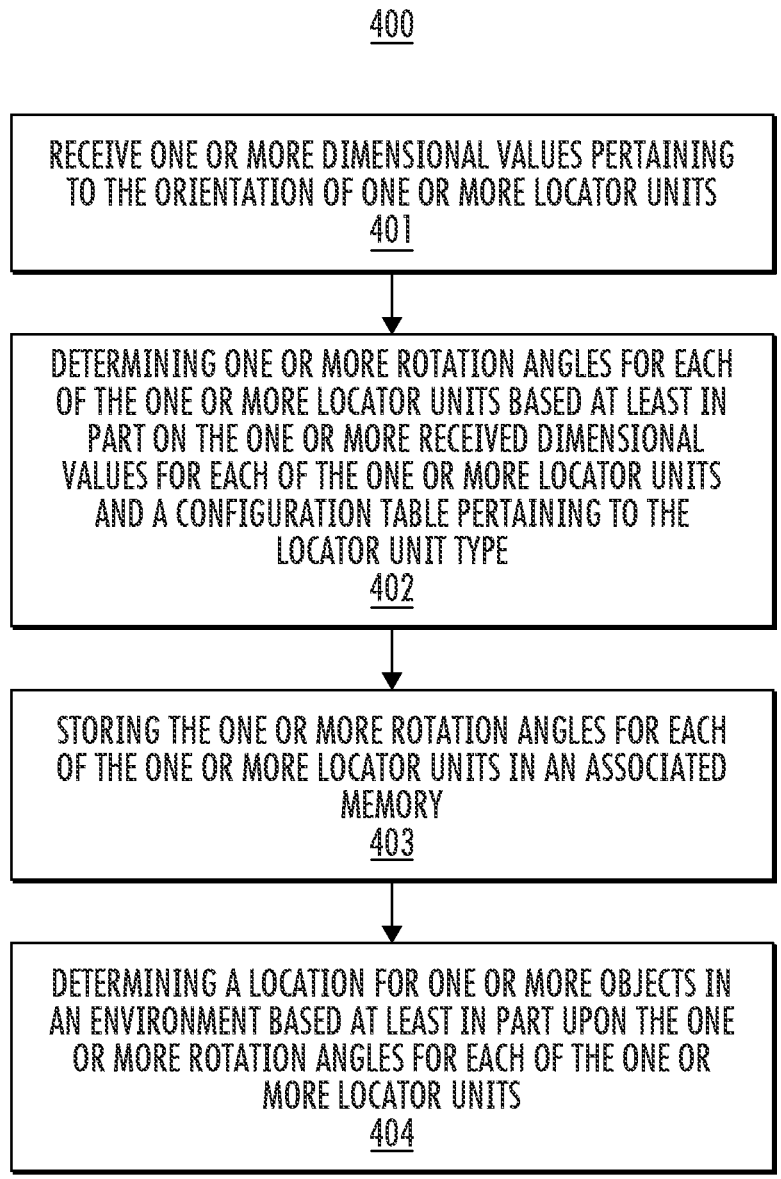
FIG. 4 is a flowchart diagram representing an example process for determining the location of one or more objects in an environment in accordance with various embodiments of the present disclosure.

FIG. 4 is a flowchart diagram of an example process 400 for automatically configuring one or more rotation angles for one or more associated locator units using a computing entity, such as computing entity 200. In some embodiments, the computing entity 200 may be a positioning computing entity configured to determine the position of one or more objects detected by one or more locator units. In some embodiments, the computing entity 200 may be a cloud-based positioning computing entity that may operate in a cloud computing environment. Via the various steps/operations of the process 400, one or more locator units, such as locator units 110 and 120, may be configured with accurate and up-to-date rotation angles indicative of the locator units orientation that may be stored in an associated memory of the computing entity 200 and in some embodiments, be used in part to determine the location of one or more objects in an environment.

The process 400 begins at step/operation 401 in which the computing entity 200, may include means such as the processing unit 204, network adaptor 265, input device interface 242, or the like, for receiving one or more dimensional values pertaining to the orientation of one or more locator units. In some embodiments, the computing entity 200 may receive the one or more dimensional values from one or more locator units in response to the corresponding locator unit of the one or more locator units being initialized and/or installed for the first time. In some embodiments, the computing entity 200 may receive the one or more dimensional values from one or more locator units in response to the corresponding locator unit being moved or otherwise reoriented, as will be discussed further with respect to FIG. 6.

In some embodiments, the one or more dimensional values pertaining to the orientation of the one or more locator units correspond to a roll, pitch, and or yaw of each locator unit of the one or more locator units. In some embodiments, the roll, pitch, and or yaw for a locator unit may be determined based at least in part on the inertial measurement unit (IMU) corresponding to the locator unit, such as IMU 350.

In some embodiments, the roll is indicative of rotation about the x-axis, pitch is indicative of rotation about the y-axis, and yaw is indicative of rotation about the z-axis. For example, the dimensional values 15°, 25°, −25° may correspond to a roll, pitch, and yaw value, respectively. These values may indicate 15 degree rotation about the x-axis, 25 degree rotation about the y-axis, and −25 degree about the z-axis. Additionally, the roll, pitch, and yaw values may be associated with a sign such that the direction of rotation about the corresponding axis is known.

In some embodiments, the computing entity 200 may also receive an indication of the locator unit corresponding to each of the one or more dimensional values. In some embodiments, the locator unit may be assigned a unique identifier, for instance by the computing entity 200, such that the computing entity 200 may uniquely identify each locator unit it is communication with. In some embodiments, each locator unit may be configured with the unique identifier such that the unique identifier is included for received transmission and thus the computing entity 200 may uniquely identify the locator unit. In some embodiments, the locator unit may be identified by its corresponding Bluetooth address, media access control (MAC) address, and/or the like. Additionally or alternatively, a locator unit may be identified with a static and/or dynamic IPv4 address and/or IPv6 address.

At step/operation 402, the computing entity 200, may include means such as the processing unit 204, system memory 206, or the like, for determining one or more rotation angles for each of the one or more locator units based at least in part on the one or more received dimensional values for each of the one or more locator units and a configuration table pertaining to the locator unit type. As mentioned above, in some embodiments, the computing entity 200 may also receive an indication of the locator unit corresponding to each of the one or more dimensional values. For example, the computing entity 200 may receive dimensional values 15°, 25°, −25° corresponding to locator unit identifier XYZ123. The computing entity 200 may compare the received one or more dimensional values for each locator unit to with one or more dimensional values in the configuration table. The one or more dimensional values in the configuration table correspond to one or more rotation angles. As such, the computing entity 200 may determine the one or more rotation angles for each of the one or more locator units by comparing the received one or more dimensional values from each locator unit to the dimensional values in the configuration table.

In some embodiments, the computing entity 200 may determine the locator unit type by accessing system memory 206. System memory 206 may be configured to store the locator unit identifier along with an indication of the locator unit type. The computing entity 200 may then determine the locator unit type based at least in part on the indication of the locator unit type and may select a configuration table pertaining to the locator unit type.

In some embodiments, the configuration table may generated for each locator unit type utilizing the computing entity 200, which may be configured to generate a configuration table for a locator unit type. In some embodiments, a remote computing entity 248 may be configured to generate the configuration table and provide the generated configuration table to the computing entity 200. In some embodiments, the configuration table may be generated by positioning the locator unit in one or more rotation angles and utilizing the corresponding IMU 350 of the locator unit to measure one or more dimensional values of the locator unit for the particular one or more rotation angles. In some embodiments, the locator unit may be positioned manually or be automatically positioned utilizing a robotic system, such as a robotic system configured to grip, pick-up, move, release, place, flip, and/or otherwise manipulate the locator unit.

In some embodiments, the granularity of the configuration table may be configured. For example, the computing entity 200 may be configured to generate a configuration table using 45 degree rotation angle increments for each of the one or more rotation angle values. In some embodiments, each rotation angle of the one or more rotation angles may be separately configured. For example, the computing entity 200 may be configured to generate a configuration table using 45 degree rotation angle increments for the x-axis and y-axis rotation angles but 90 degree increments for the z-axis rotation angle.

In some embodiments, the computing entity 200 may be configured with one or more algorithms that allows computing entity 200 to extrapolate between one or more received dimensional values and one or more dimensional values configured in configuration table. In some embodiments, the one or more algorithms may perform one or more mathematical operations. The one or more mathematical operations may use one or more values that are based at least in part on the one or more received dimensional values for each locator unit and one or more rotation angles in the configuration table for pertaining to the locator unit type. For example, the computing entity 200 may receive dimensional values of 87.3°, 1.5°, and −73.0°. However, a configuration table, such as the configuration table depicted in FIG. 5 may not include the one or more dimensional values exactly matching the one or more received dimensional values. Computing entity 200 may select the one or more dimensional values in the configuration table most closely matching the dimensional values, such as dimensional values 1.9°, 1.5°, and −73.0° and extrapolate between different dimensional values, such as dimensional values 176.4°, 1.5°, and −73.0. Dimensional values 1.9°, 1.5°, and −73.0° may correspond to rotation angles 0, 0, 0 on the x-axis, y-axis, and z-axis, respectively, and dimensional values 176.4°, 1.5°, and −73.0° may correspond to rotation angles 180, 0, 0 on the x-axis, y-axis, and z-axis, respectively. As such, computing entity 200 may determine the rotation angles to be 90, 0, 0. It should be noted that the configuration table depicted in FIG. 5 is purely exemplary and should not be taken as limiting in anyway. Further, it should be appreciated that the values described in FIG. 5 are subject to change depending on the locator unit.

FIG. 5 depicts an operational example of a configuration table 500 pertaining to the locator unit type. In some embodiments, the configuration table 500 may provide one or more corresponding rotation angles 501 for one or more particular dimensional values 502. In some embodiments, the configuration table 500 provides one or more rotation angles 501 for a particular roll, pitch, and/or yaw value 502. In some embodiments, the configuration table 500 provides one or more rotation angles 501 in along the x-axis, y-axis, and z-axis for a particular roll, pitch, and/or yaw value 502.

At step/operation 403, the computing entity 200, may include means such as the processing unit 204, system memory 206, or the like, for storing the one or more rotation angles for each of the one or more locator units. The one or more rotation angles as determined in step/operation 402 may be stored in an associated memory, such as system memory 206 for each of the one or more locator units. As such, the one or more rotation angles for the one or more locator units is indicative of the real-time or near real-time one or more rotation angles for the one or more locator units. This allows position of one or more objects detected by the one or more locator units to be accurately determined.

In some embodiments, an audit log may be generated and/or updated to indicate a change in the one or more rotation angles for the one or more locator units. In some embodiments, an audit log may be used for each locator unit. In some embodiments, an audit log may be used for one or more locator units. The audit log may include information indicative of the locator unit type, the locator unit identifier, one or more dimensional values, one or more rotation angles, a timestamp for a change in the one or more dimensional values and/or one or more rotation angles, one or more dimensional values after updating, one or more rotational angles after updating, and the like. As such, the audit log may be used to track any changes in orientation for the one or more locator units.

At step/operation 404, the computing entity 200, may include means such as the processing unit 204, network adaptor 265, input device interface 242, system memory 206, or the like, for determining a location for one or more objects in an environment based at least in part upon the one or more rotation angles for each of the one or more locator units. The one or more rotation angles for each of the one or more locator units may be indicative of the orientation of each of the one or more locator units. As will be discussed in greater detail in FIG. 8, the computing entity 200 may determine the location of one or more objects in an environment. In some embodiments, the one or more objects may be detected by the one or more locator units and the computing entity 200 may determine the location of the one or more objects based at least in part on the one or more rotation angles for each of the one or more locator units that detected the one or more objects.

Figure 6:
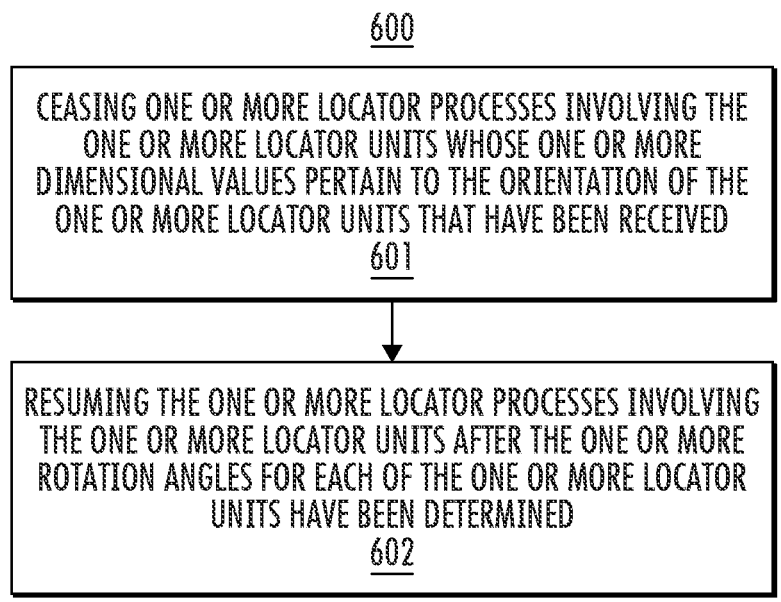
FIG. 6 is a flowchart diagram representing an example process for updating the one or more rotation angles of one or more locator units in accordance with various embodiments of the present disclosure.

In some embodiments, step/operation 401 may be performed in accordance with the various steps/operations of the process 600 depicted in FIG. 6, which is a flowchart diagram of an example process for managing one or more locator processes.

At step/operation 601, the computing entity 200, may include means such as the processing unit 204, network adaptor 265, input device interface 242, system memory 206, or the like, for ceasing one or more locator processes involving one or more locator units whose one or more dimensional values pertain to the orientation of the one or more locator units that have been received. For example, the computing entity 200 may receive one or more dimensional values for locator units 110 and 120. As such, the computing entity 200 may cease all locator processes involving the locator units 110 and 120. This may prevent incorrect object location determinations as receiving one or more dimensional values for the one or more locator units may be indicative that the one or more locator units have shifted in orientation and thus, the associated one or more rotation angles need to be updated.

At step/operation 602, the computing entity 200 may include means such as the processing unit 204, network adaptor 265, input device interface 242, system memory 206, or the like, for resuming the one or more locator processes involving the one or more locator units after the one or more rotation angles for each of the one or more locator units have been determined. For example, the computing entity 200 may determine the one or more rotation angles and stores the one or more rotation angles in an associated memory as described in step/operations 402 and 403, respectively, for locator units 110 and 120. As such, the computing entity 200 may resume the one or more locator processes involving locator units 110 and 120. The computing entity 200 may now be configured with the most up-to-date one or more rotation angles and thus may use the one or more rotation angles for locator processes, such as determining the location of an object in an environment.

Figure 7:
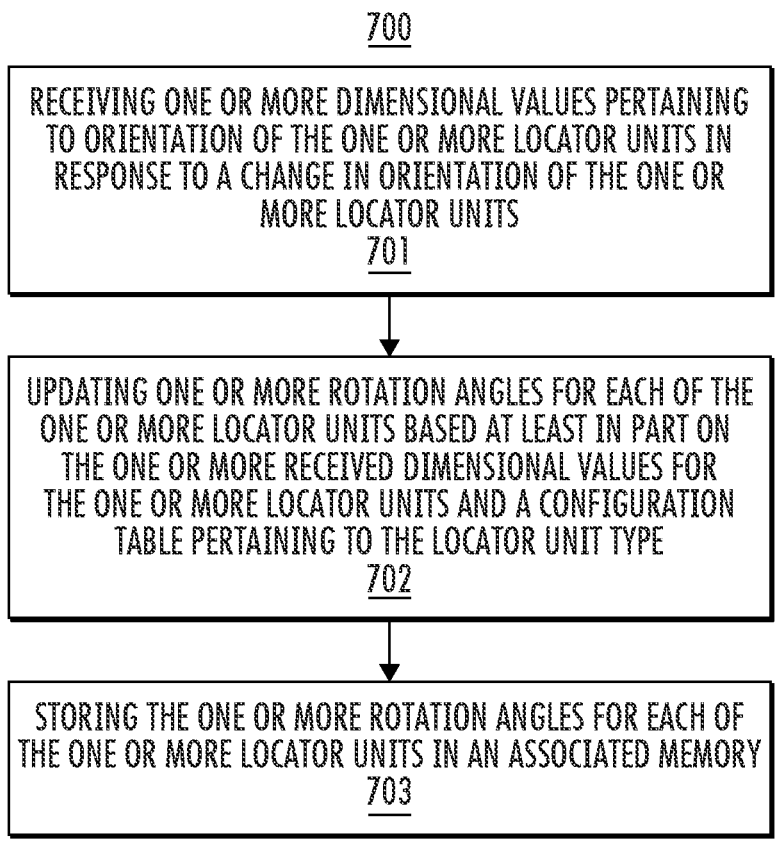
FIG. 7 is a flowchart diagram representing an example process for managing one or more locator processes in accordance with various embodiments of the present disclosure.

In some embodiments, step/operation 402 may be performed in accordance with the various steps/operations of the process 700 depicted in FIG. 7, which is a flowchart diagram of an example process for updating one or more rotation angles for one or more locator units.

At step/operation 701, the computing entity 200, may include means such as the processing unit 204, network adaptor 265, input device interface 242, system memory 206, or the like, for receiving one or more dimensional values pertaining to the orientation of the one or more locator units in response to a change in orientation of the one or more locator units. For example, if one or more rotation angles for locator unit 110 had previously been determined as described above with respect to step/operation 402, and the locator unit 110 was bumped such that the orientation of locator unit 110 has shifted, the computing entity 200 may receive one or more dimensional values from locator unit 110.

In some embodiments, the computing entity 200 may receive the one or more dimensional values from the one or more locator units in an instance the change in orientation (e.g. the one or more dimensional values) of the one or more locator units satisfies one or more predefined dimensional threshold values. A predefined dimensional threshold value may be configured to control the sensitivity of orientation changes for a locator unit. In some embodiments, the predefined dimensional threshold may be a dimensional value or a percentage. For example, if locator unit 110 exceeds a rotation by 2° or more, the computing entity 200 may receive one or more dimensional values indicative of the new orientation of locator unit 110. In some embodiments, the predefined dimensional threshold may require two or more changes in dimensional values. For example, if locator unit 110 has associated changes in the dimensional values of the x-axis and y-axis, the computing entity 200 may receive one or more dimensional values indicative of the new orientation of locator unit 110. In some embodiments, each locator unit of the one or more locator units may be configured with one or more of the same predefined dimensional threshold values and/or may be configured with one or more different predefined dimensional threshold values. In this way, the predefined dimensional threshold value may control the sensitivity of the orientation of the one or more locator units and thus may reduce network traffic and bandwidth usage as well as computational resources and storage.

At step/operation 702, the computing entity 200, may include means such as the processing unit 204, system memory 206, or the like, for updating the one or more rotation angles for each of the one or more locator units based at least in part on the one or more received dimensional values for the one or more locator units and a configuration table pertaining to the locator unit type. In some embodiments, step/operation 702 may be substantially similar to step/operation 402. In some embodiments, the computing entity 200 may also receive an indication of the locator unit corresponding to each of the one or more dimensional values. For example, the computing entity 200 may receive dimensional values 15°, 25°, −25° corresponding to locator unit identifier XYZ123. In some embodiments, the computing entity 200 may determine the locator unit type by accessing system memory 206. System memory 206 may be configured to store the locator unit identifier along with an indication of the locator unit type. The computing entity 200 may then determine the locator unit type based at least in part on the indication of the locator unit type and may select a configuration table pertaining to the locator unit type. As such, the one or more rotation angles for the one or more locator units may be updated to the current rotation angles as indicated by the one or more received dimensional values.

At step/operation 703, the computing entity 200, may include means such as the processing unit 204, system memory 206, or the like, for storing the one or more rotation angles for each of the one or more locator units in an associated memory. The one or more rotation angles as determined in step/operation 602 may be stored in an associated memory, such as system memory 206 for each of the one or more locator units. As such, the rotation angle for the one or more locator units is indicative of the real-time or near real-time one or more rotation angles for the one or more locator units. This allows position of one or more objects detected by the one or more locator units to be accurately determined. In some embodiments, step/operation 703 may be substantially similar to step/operation 403.

Figure 8:
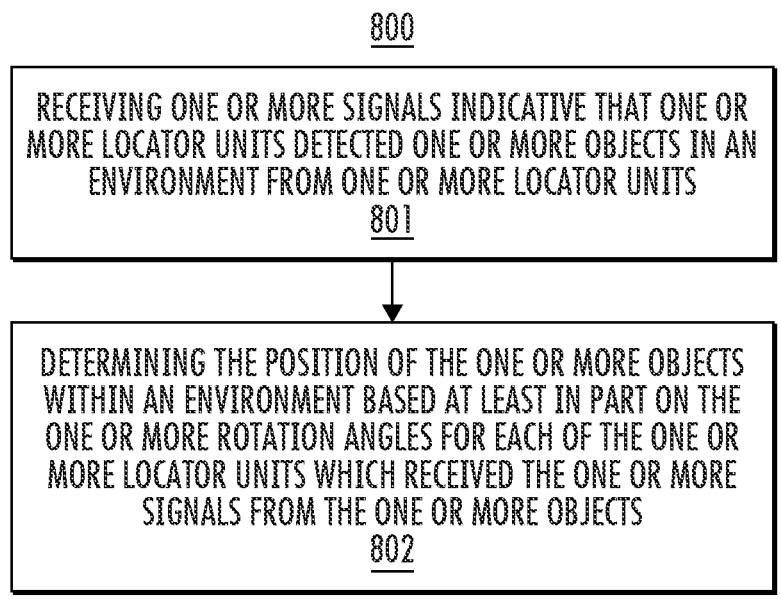
FIG. 8 is a flowchart diagram representing an example process determining a position of one or more objects in an environment based at least in part on one or more received signals in accordance with various embodiments of the present disclosure.

In some embodiments, step/operation 404 may be performed in accordance with the various steps/operations of the process 800 depicted in FIG. 8, which is a flowchart diagram of an example process for determining the location of one or more objects in an environment.

At step/operation 801, the computing entity 200, may include means such as the processing unit 204, network adaptor 265, input device interface 242, system memory 206, or the like, for receiving one or more signals indicative that one or more locator units detected one or more objects in an environment from one or more locator units. In some embodiments, the one or more received signals may be indicative of an AOA, AOD, and/or AOX between the one or more locator units and the object similar to FIG. 1B. In some embodiments, the one or more signals received from the one or more locator units may indicate a signal phase as received by each antenna array element of the antenna array for each locator unit of the one or more locator units. In some embodiments, the one or more signals received from the one or more locator units may indicate a signal phase difference between two or more antenna array elements of the antenna array for each locator unit of the one or more locator units. In some embodiments, the one or more signals received from the one or more locator units may indicate one or more AOAs, AODs, and/or AOXs for each locator unit as determined by the corresponding locator unit.

At step/operation 802, the computing entity 200 may include means such as the processing unit 204, system memory 206, or the like, for determining the position of the one or more objects within an environment based at least in part on the one or more rotation angles for each of the one or more locator units which received the one or more signals from the one or more objects. In some embodiments, the computing entity 200 may determine the AOA, AOD, and/or AOX between the one or more locator units and the one or more objects based at least in part on the one or more received signals from the one or more locator units and utilizing the one or more rotation angles for each locator unit as stored in an associated memory, such as system memory 206. The computing entity 200 may determine an elevation angle and/or azimuthal angle based at least in part on the AOA, AOD, and/or AOX. As such, the computing entity 200 may determine a location for the one or more objects detected by the one or more locator units using the elevation angle, and/or azimuthal angle. In some embodiments, the object position may be determined in 2-dimensional space. In some embodiments, the object position may be determined in 3-dimensional space. In some embodiments, the computing entity 200 may be store the coordinates of the locator unit in an associated memory, such as system memory 206. In some embodiments, the location of the one or more objects in an environment may be determined with sub-meter accuracy.

In some embodiments, the location of the one or more objects is a relative location of the object. For example, if the object is only detected by one locator unit, the object location may be a direction relative to the locator unit and within associated proximity range of the locator unit. In some embodiments, if the computing entity 200 may restrict the location of the object to within a proximity range of the locator unit. For example, if computing entity 200 receives an indication that locator unit 110 has detected an object but does not receive an indication that an object is detected by adjacent locator unit 120, the computing entity 200 may restrict the object location to within the proximity range 110c that does not overlap with the proximity range 120c.

In some embodiments, the object may be detected by two or more locator units. As such, the computing entity 200 may utilize techniques, such as triangulation to determine the location of an object with greater accuracy. For example, if the object is detected by locator units 110 and 120, the computing entity 200 may determine the coordinates of an object based at least in part on the intersection of extension liens using the AOA, AOD, AOX, azimuthal, and/or elevation angles for each locator unit that detected the object.

Figure 9:
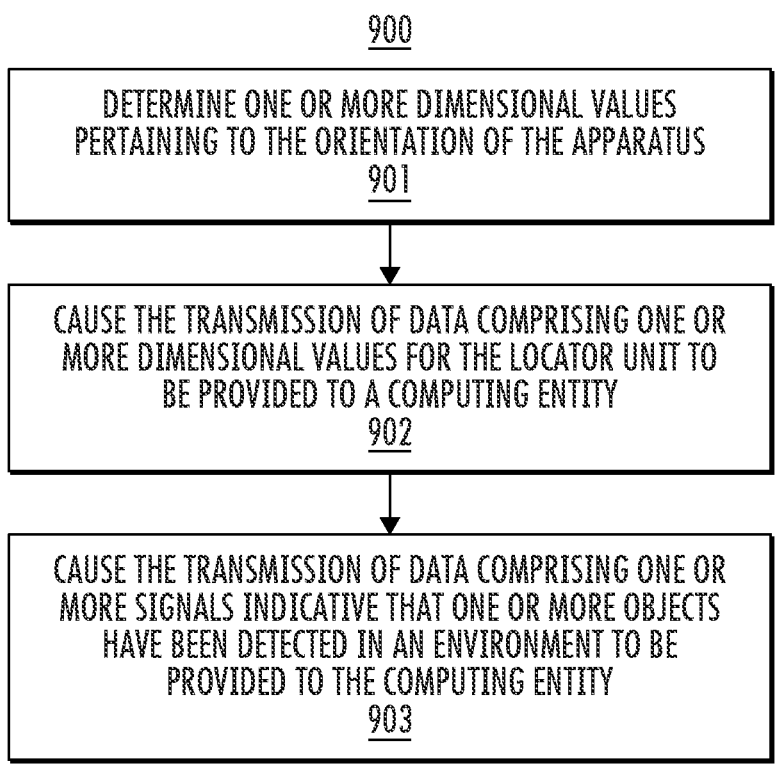
FIG. 9 is a flowchart diagram representing an example process for providing one or more dimensional values to a computing entity in accordance with various embodiments of the present disclosure.

Referring now to FIG. 9, a flowchart diagram of an example process 900 for causing the transmission of data to a computing entity using a computing entity, such as computing entity 300. In some embodiments, the computing entity 300 may comprise a locator unit configured to receive one or more signals from one or more objects within an associated proximity range. Via the various steps/operations of the process 900, a locator unit may cause the transmission of data indicative of one or more dimensional values and/or cause the transmission of data comprising one or more signals indicative that one or more objects have been detected in an environment.

At step/operation 901, the computing entity 300, such as a locator unit, may include means such as the processor 308, IMU 350, one or more gyroscopes 352, one or more accelerometers 354, one or more magnetometers 356, or the like, for determining one or more dimensional values pertaining to the orientation of the computing entity 300. In some embodiments, the one or more dimensional values may be determined using the IMU 350. In some embodiments, the one or more dimensional values may be determined using one or more accelerometers 354. In some embodiments, the one or more accelerometers 354 may determine a dimensional value along the x-axis, y-axis, and z-axis. In some embodiments, the x-axis, y-axis, and z-axis may be configured based at least in part on the one or more magnetometers 356. For example, the one or more magnetometers 356 may initialize the x-axis, y-axis, and z-axis based on the at least in part on the magnetic field of the Earth and/or the gravity.

At step/operation 902, the computing entity 300, such as a locator unit, may include means such as the processor 308, network interface 320, or the like, for causing the transmission of data comprising one or more dimensional values for the locator unit to a computing entity, such as computing entity 200. After the locator unit has determined its one or more corresponding dimensional values, it may transmit this information to a computing entity, such as computing entity 200. As such, the computing entity, such as computing entity 200 may be configured to accurately determine the one or more corresponding rotation angles for the locator unit.

At step/operation 903, the computing entity 300, such as a locator unit, may include means such as the processor 308, network interface 320, or the like, for causing the transmission of data comprising one or more signals indicative of that one or more objects have been detected in an environment to the computing entity, such as computing entity 200. The locator unit may be configured to detect one or more objects within its proximity range by receiving one or more signals from the object. The locator unit may transmit data comprising one or more signals indicative that the object has been detected to the computing entity 200. This will be discussed in more detail in FIG. 11.

Figure 10:
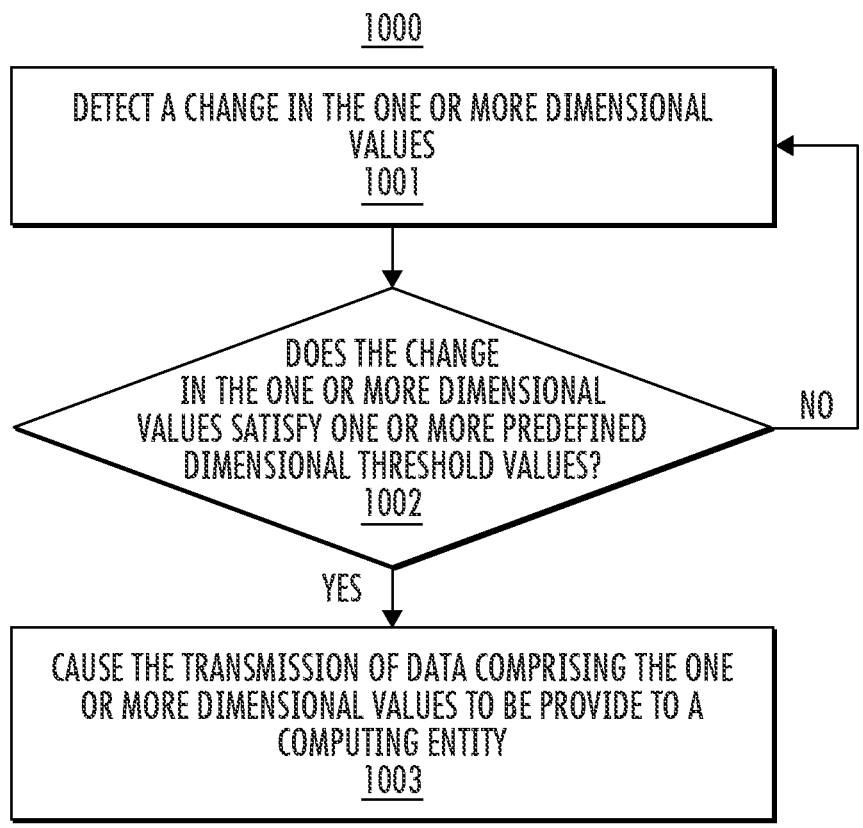
FIG. 10 illustrates a logic for example operations in accordance with various embodiments of the present disclosure.

In some embodiments, step/operation 901 may be performed in accordance with the various steps/operations of the process 1000 depicted in FIG. 10, which is a flowchart diagram of an example process for detecting a change in one or more dimensional values for a computing entity 300, such as a locator unit.

At step/operation 1001, the computing entity 300, such as a locator unit, may include means such as processor 308, IMU 350, one or more gyroscopes 352, one or more accelerometers 354, one or more magnetometers 356, or the like, for detecting a change in the one or more dimensional values. A change in the one or more dimensional values may result from a change in orientation, such as when a locator unit is moved, bumped, or otherwise changes orientation. In some embodiments, the change in the one or more dimensional values may be determined by the IMU 150. In some embodiments, the change in the one or more dimensional values may be determined by the one or more accelerometers 354. For example, the one or more dimensional values may be determined using the one or more accelerometers 354, which may be configured to measure the acceleration forces in an x-axis, y-axis, and/or z-axis. In an instance the acceleration forces in the x-axis, y-axis, and/or z-axis, the processor 308 may determine a change in one or more dimensional values has occurred.

At step/operation 1002, the computing entity 300, such as a locator unit, may include means such as processor 308, volatile memory 322, non-volatile memory 324, IMU 350, one or more gyroscopes 352, one or more accelerometers 354, one or more magnetometers 356, or the like, for determining if the change in the one or more dimensional values satisfies one or more predefined dimensional threshold values. A predefined dimensional threshold value may be configured to control the sensitivity of the orientation for a locator unit. In some embodiments, the predefined dimensional threshold may be a dimensional value or a percentage. For example, the dimensional threshold values may be 2°, such that any acceleration force in the x-axis, y-axis, and/or z-axis exceeding a 2° rotation satisfies the predefined dimensional threshold value. In some embodiments, the predefined dimensional threshold may require two or more changes in dimensional values. For example, the dimensional threshold values may be 2° for two or more acceleration forces, such that two of the three acceleration forces in the x-axis, y-axis, and/or z-axis exceeding a 2° rotation satisfies the predefined dimensional threshold value. The one or more predefined dimensional thresholds may be uniquely configured for the locator unit. As such, the predefined dimensional threshold value may control the sensitivity of the detection of orientation changes of the one or more locator units and thus may reduce network traffic and bandwidth usage as well as computational resources and storage.

In some embodiments, the processor 308 of the locator unit may store the one or more dimensional values in an associated memory, such as volatile memory 322 and/or non-volatile memory 324. In an instance a change in the one or more dimensional values is detected as described in step/operation 1001, the locator unit may utilize processor 308 to determine the magnitude of change in each of the one or more dimensional values. In some embodiments, processor 308 may access volatile memory 322 and/or non-volatile memory 324 to determine the one or more dimensional values previously detected and stored.

In the instance the one or more dimensional values does not satisfy the one or more predefined dimensional threshold values, the no action is taken, and the locator unit returns to step/operation 1001 to monitor and/or detect changes in the one or more dimensional values.

In the instance the one or more dimensional values satisfy the one or more predefined dimensional threshold values, the locator unit proceeds to step/operation 1003. At step/operation 1003, the computing entity 300, such as a locator unit, may include means such as processor 308, network interface 320, or the like, for causing the transmission of the one or more dimensional values to be provided to a computing entity, such as computing entity 200. This may be substantially similar to step/operation 902. Here, the locator unit has determined a sufficient change in its orientation (e.g. one or more dimensional values satisfy one or more predefined dimensional threshold values) and informs the computing entity, such as computing entity 200 of this change in orientation. As such, the computing entity 200 is apprised of the real-time or near real-time orientation of the locator unit.

Figure 11:
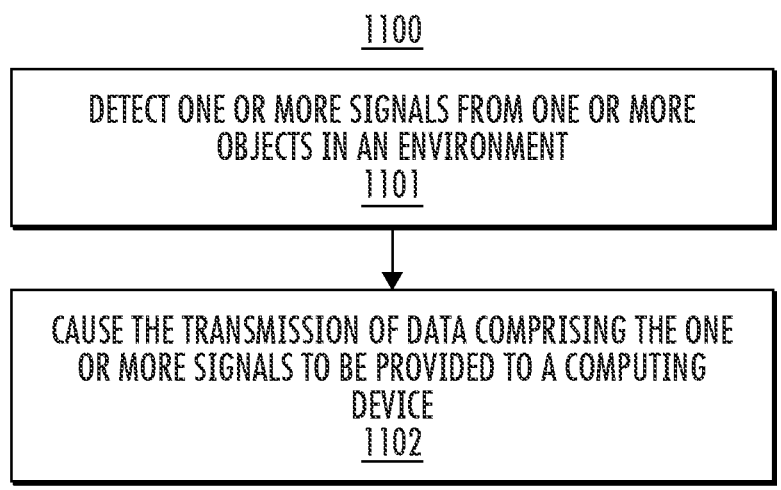
FIG. 11 is a flowchart diagram representing an example process for providing one or more signals to a computing entity in accordance with various embodiments of the present disclosure.

In some embodiments, step/operation 903 may be performed in accordance with the various steps/operations of the process 1100 depicted in FIG. 11, which is a flowchart diagram of an example process for a computing entity 300, such as a locator unit, detecting one or more objects in an environment.

At step/operation 1101, the computing entity 300, such as a locator unit, may include means such as processor 308, one or more receivers 306, one or more transmitters 304, or the like, for detecting one or more signals from one or more objects in an environment. In some embodiments, the locator unit may detect one or more signals, such as one or more BT signals from an object, such as a tag. This may be caused by the tag being located within the proximity range of the locator unit such that the one or more receivers 306 of the locator unit receives the one or more signals transmitted from the object. As such, the locator unit may detect the object within its proximity range. In some embodiments, the one or more signals received by the locator unit, such as by utilizing one or more receivers 306, may indicate a signal phase. In some embodiments, the one or more signals received from the one or more locator units, such as by utilizing one or more receivers 306, may indicate a signal phase difference between two or more receivers 306. In some embodiments, the one or more signals received by the locator unit may be used to determine one or more AOAs, AODs, and/or AOX between the object and the locator unit, such as by utilizing the processor 308.

At step/operation 1102, the computing entity 300, such as a locator unit, may include means such as processor 308, network interface 320, or the like, for causing the transmission of data comprising the one or more signals to be provided to a computing device, such as computing device 200. In some embodiments, the locator unit may transmit data comprising the signal phase for each antenna array element (e.g. one or more receivers 306). In some embodiments, the locator unit may transmit data comprising the signal phase difference between two or more antenna array elements. In some embodiments, the locator unit may transmit data comprising the AOA, AOD, and/or AOX between the one or more objects and the locator unit. As such, the computing entity, such as computing entity 200, may be provided with the means to determine the position of the object in the environment.

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

That which is claimed is:

1. A method for automatically configuring one or more rotation angles for one or more locator units, the method comprising:
   receiving, from the one or more locator units, one or more dimensional values pertaining to an orientation of the one or more locator units;
   determining, based at least in part on the one or more received dimensional values for each of the one or more locator units and a configuration table pertaining to a locator unit type, the one or more rotation angles for each of the one or more locator units;
   storing the one or more rotation angles for the each of the one or more locator units in a memory;
   determining a location for one or more objects in an environment based at least upon the one or more rotation angles for each of the one or more locator units; and
   updating, based at least in part on the one or more received dimensional values for each of the one or more locator units and the configuration table pertaining to the locator unit type, the one or more rotation angles for each of the one or more locator units.

2. The method of claim 1, wherein the one or more dimensional values pertaining to the orientation of the one or more locator units correspond to a roll, pitch, and yaw value and wherein the configuration table pertaining to the locator unit type provides one or more corresponding rotation angles for a particular roll, pitch, and yaw value.

3. The method of claim 1, wherein the determined one or more rotation angles correspond to the one or more dimensional values, in the configuration table, that match with the one or more received dimensional values.

4. The method of claim 3, wherein determining the one or more rotation angles for the one or more locator units comprises applying one or more mathematical operations, wherein the one or more mathematical operations use one or more values based at least in part on the one or more received dimensional values for each locator unit and the one or more rotation angles in the configuration table for pertaining to the locator unit type.

5. The method of claim 1 further comprising:
   receiving, from the one or more locator units, one or more signals indicative that one or more locator units detected one or more objects in the environment; and
   determining, based at least in part on the one or more rotation angles for each of the one or more locator units which received the one or more signals, a position of the one or more objects within the environment.

6. The method of claim 5, wherein the one or more signals are indicative of an angle of arrival or angle of departure between each of the one or more locator units and each of the one or more objects.

7. The method of claim 1, wherein the one or more dimensional values pertaining to the orientation of the one or more locator units are received in an instance a change in the orientation of the one or more locator units satisfies one or more predefined dimensional threshold values.

8. The method of claim 1, further comprising:
   ceasing one or more locator processes involving the one or more locator units whose the one or more dimensional values pertaining to the orientation of the one or more locator units have been received; and
   resuming the one or more locator processes involving the one or more locator units after the one or more rotation angles for each of the one or more locator units have been determined.

9. An apparatus comprising:
   an antenna array comprising one or more antenna array elements;
   an inertial measurement unit;
   at least one processing component configured to:
   determine, by utilizing the inertial measurement unit, one or more dimensional values pertaining to an orientation of the apparatus;

cause a first transmission of data comprising the one or more dimensional values to be provided to a computing entity; and cause a second transmission of data comprising one or more signals indicative that one or more objects have been detected in an environment to be provided to the computing entity.

10. The apparatus of claim 9, wherein the at least one processing component is further configured to:

detect, by utilizing the inertial measurement unit, a change in the one or more dimensional values pertaining to the orientation of the apparatus;

determine if the change in the one or more dimensional values satisfies one or more dimensional threshold values; and in an instance the one or more dimensional values satisfy the one or more dimensional threshold values, cause the first transmission of data comprising the one or more dimensional values to be provided to the computing entity.

11. The apparatus of claim 9, wherein the at least one processing component is further configured:

detect, by utilizing the one or more antenna array elements, the one or more signals from the one or more objects in the environment, wherein the one or more objects are configured to transmit the one or more signals and the one or more antenna array elements are configured to receive the one or more signals; and cause the second transmission of data comprising the one or more signals received by the one or more antenna array elements from the one or more objects to be provided to the computing entity.

12. The apparatus of claim 11, wherein the one or more signals are indicative of an angle of arrival or angle of departure between each of the one or more antenna array elements and each of the one or more objects.

13. The apparatus of claim 9, wherein the one or more dimensional values correspond to a roll, pitch, and yaw value.

14. The apparatus of claim 9, wherein the computing entity operates in a cloud computing environment.

15. The apparatus of claim 9, wherein the inertial measurement unit comprises a gyroscope, accelerometer, and magnetometer.

16. An apparatus for automatically configuring one or more rotation angles for one or more locator units, the apparatus comprising at least one processing component configured to:

Receive, from the one or more locator units, one or more dimensional values pertaining to an orientation of the one or more locator units;

determine, based at least in part on the one or more received dimensional values for each of the one or more locator units and a configuration table pertaining to a locator unit type, the one or more rotation angles for each of the one or more locator units;

store the one or more rotation angles for the each of the one or more locator units in a memory;

determine a location for one or more objects in an environment based at least upon the one or more rotation angles for each of the one or more locator units; and update, based at least in part on the one or more received dimensional values for each of the one or more locator units and the configuration table pertaining to the locator unit type, the one or more rotation angles for each of the one or more locator units.

17. The apparatus of claim 16, wherein the one or more dimensional values pertaining to the orientation of the one or more locator units correspond to a roll, pitch, and yaw value and wherein the configuration table pertaining to the locator unit type provides one or more corresponding rotation angles for a particular roll, pitch, and yaw value.

18. The apparatus of claim 16, the at least one processing component further configured to:

receive, from the one or more locator units, one or more signals indicative that one or more locator units detected one or more objects in the environment; and determine, based at least in part on the one or more rotation angles for each of the one or more locator units which received the one or more signals, a position of the one or more objects within the environment.

* * * * *